US006952340B2

(12) United States Patent
Son et al.

(10) Patent No.: US 6,952,340 B2
(45) Date of Patent: Oct. 4, 2005

(54) PORTABLE COMPUTER AND METHOD

(75) Inventors: Kyoung Sun Son, Seoul (KR); Yun Seop Kim, Incheon-si (KR)

(73) Assignee: LG Electronics, Inc., Seoul (KR)

( * ) Notice: Subject to any disclaimer, the term of this patent is extended or adjusted under 35 U.S.C. 154(b) by 33 days.

(21) Appl. No.: 10/375,119

(22) Filed: Feb. 28, 2003

(65) Prior Publication Data

US 2004/0090742 A1 May 13, 2004

(30) Foreign Application Priority Data

Nov. 11, 2002 (KR) .............................. 10-2002-0069833

(51) Int. Cl.$^7$ ................................................ G06F 1/16
(52) U.S. Cl. ...................... 361/680; 361/681; 361/686; 312/223.2
(58) Field of Search ................................ 361/680, 681, 361/683, 686; 312/223.1, 223.2; 710/303

(56) References Cited

U.S. PATENT DOCUMENTS

| | | | | |
|---|---|---|---|---|
| 5,316,491 A | | 5/1994 | Satou et al. ................ 439/159 |
| 5,335,142 A | | 8/1994 | Anderson .................... 361/681 |
| 5,436,792 A | * | 7/1995 | Leman et al. ................ 361/686 |
| 6,108,200 A | | 8/2000 | Fullerton ..................... 361/686 |
| 6,275,376 B1 | | 8/2001 | Moon .......................... 361/683 |
| 2003/0221876 A1 | * | 12/2003 | Doczy et al. ............. 178/18.01 |
| 2003/0222149 A1 | * | 12/2003 | Solomon et al. ......... 235/472.01 |
| 2003/0222848 A1 | * | 12/2003 | Solomon et al. ........... 345/156 |
| 2003/0223185 A1 | * | 12/2003 | Doczy et al. ............... 361/680 |
| 2003/0235029 A1 | * | 12/2003 | Doherty et al. ............. 361/683 |

* cited by examiner

Primary Examiner—Lynn Feild
Assistant Examiner—Anthony Q. Edwards
(74) Attorney, Agent, or Firm—Fleshner & Kim, LLP

(57) ABSTRACT

The present invention is related to an apparatus that can include a portable computer with a keyboard apparatus and/or a docking station. A keyboard apparatus can be secured to a main body of the computer system and selectively enable users to input data when the computer (e.g., web pad) is turned on. The keyboard apparatus can be used for a portable multi-type computer with web pad function and notebook personal computer. The docking station can include a stand pivotably coupled to a dock that can receive the main body with/without the keyboard apparatus. The docking station can support selective display in a portrait or landscape mode. Further, combinations of the portable multi-type computer allows unique versatility of viewable options of a display of the main body (e.g., web pad) when with the keyboard apparatus and/or docking station.

31 Claims, 35 Drawing Sheets

FIG. 8A
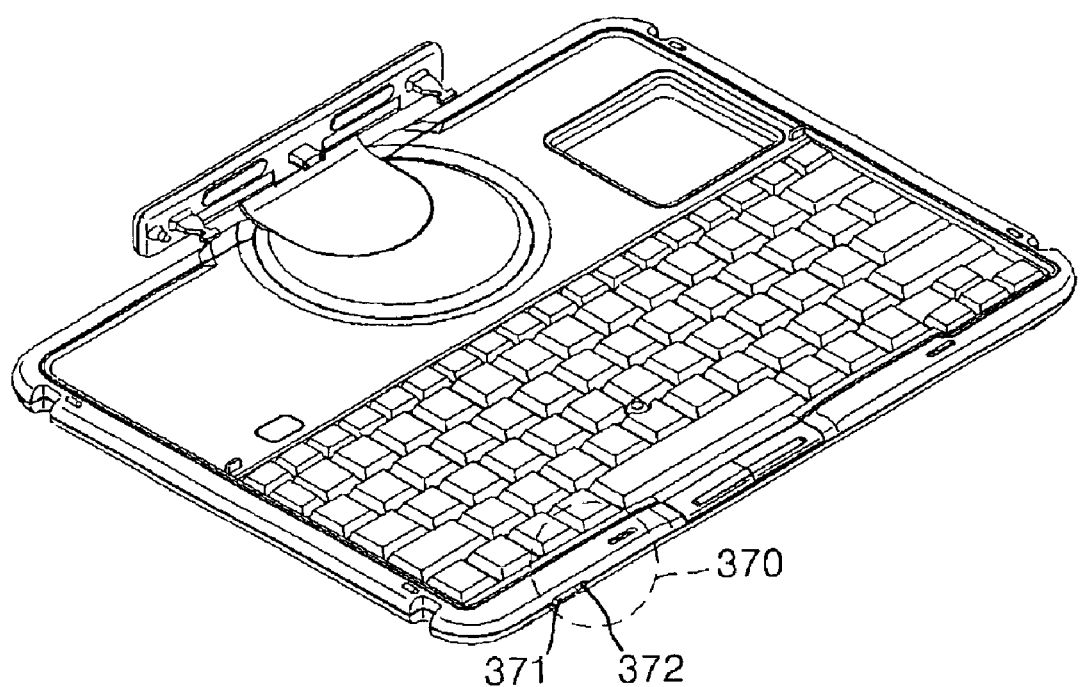
(Before being connected to main body)
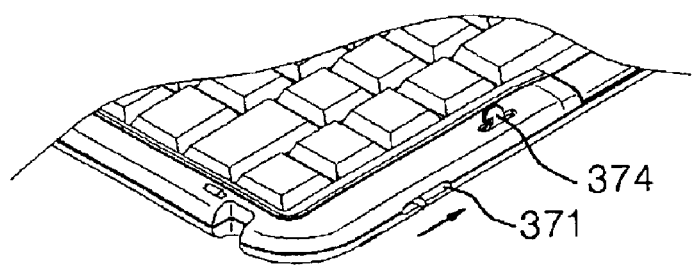
(After being connected to main body)

Before locking keyboard opening/closing button

After locking keyboard opening/closing button

FIG. 13A
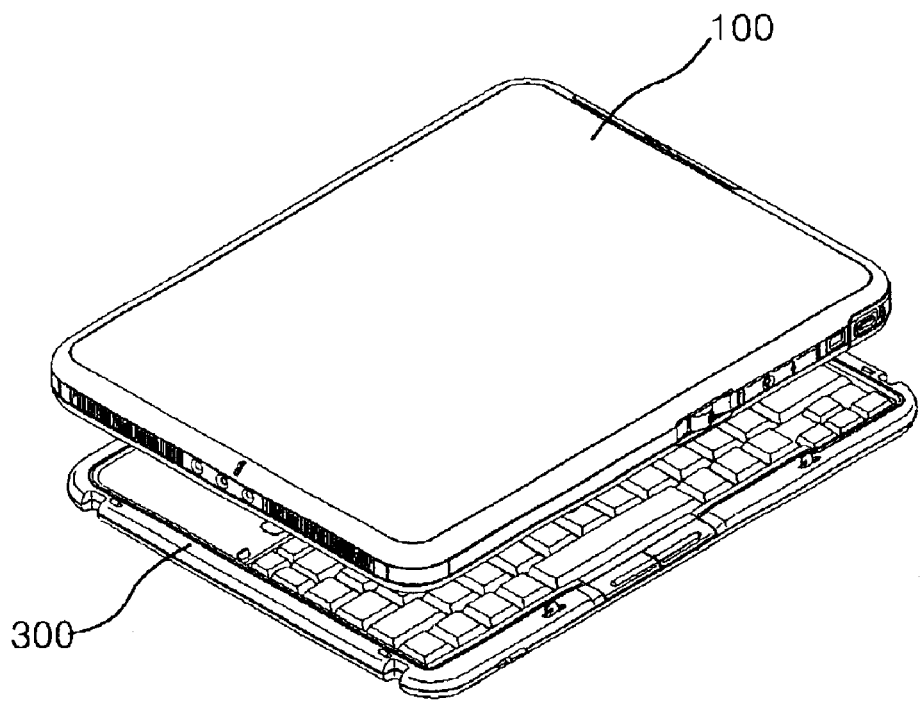
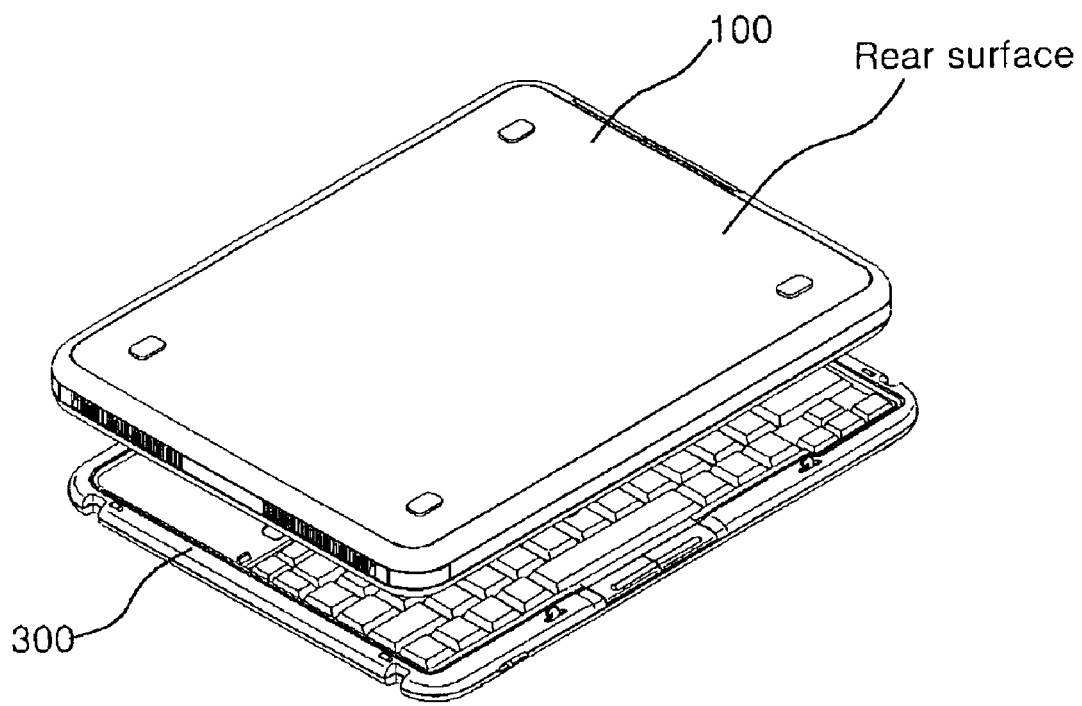

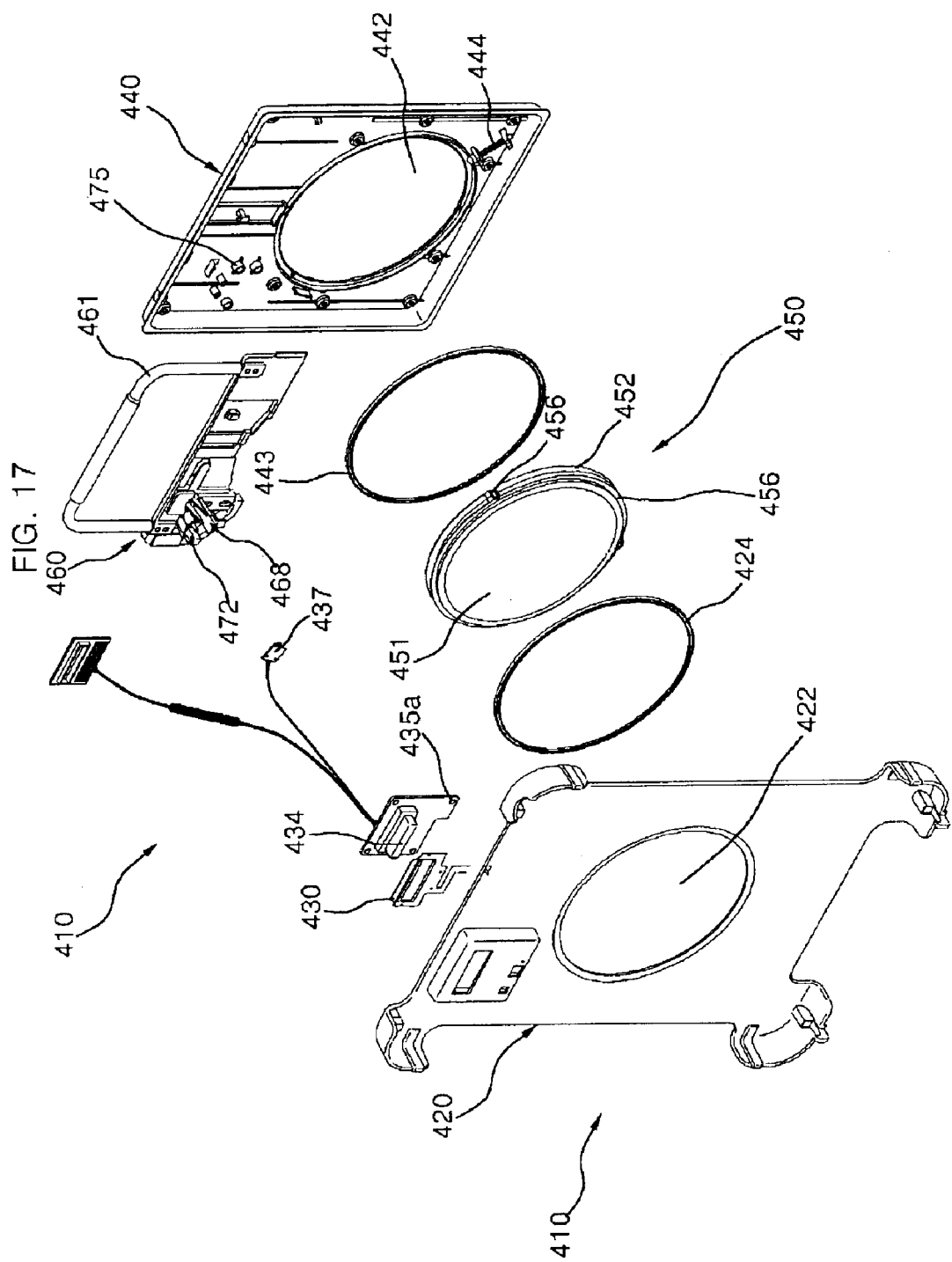

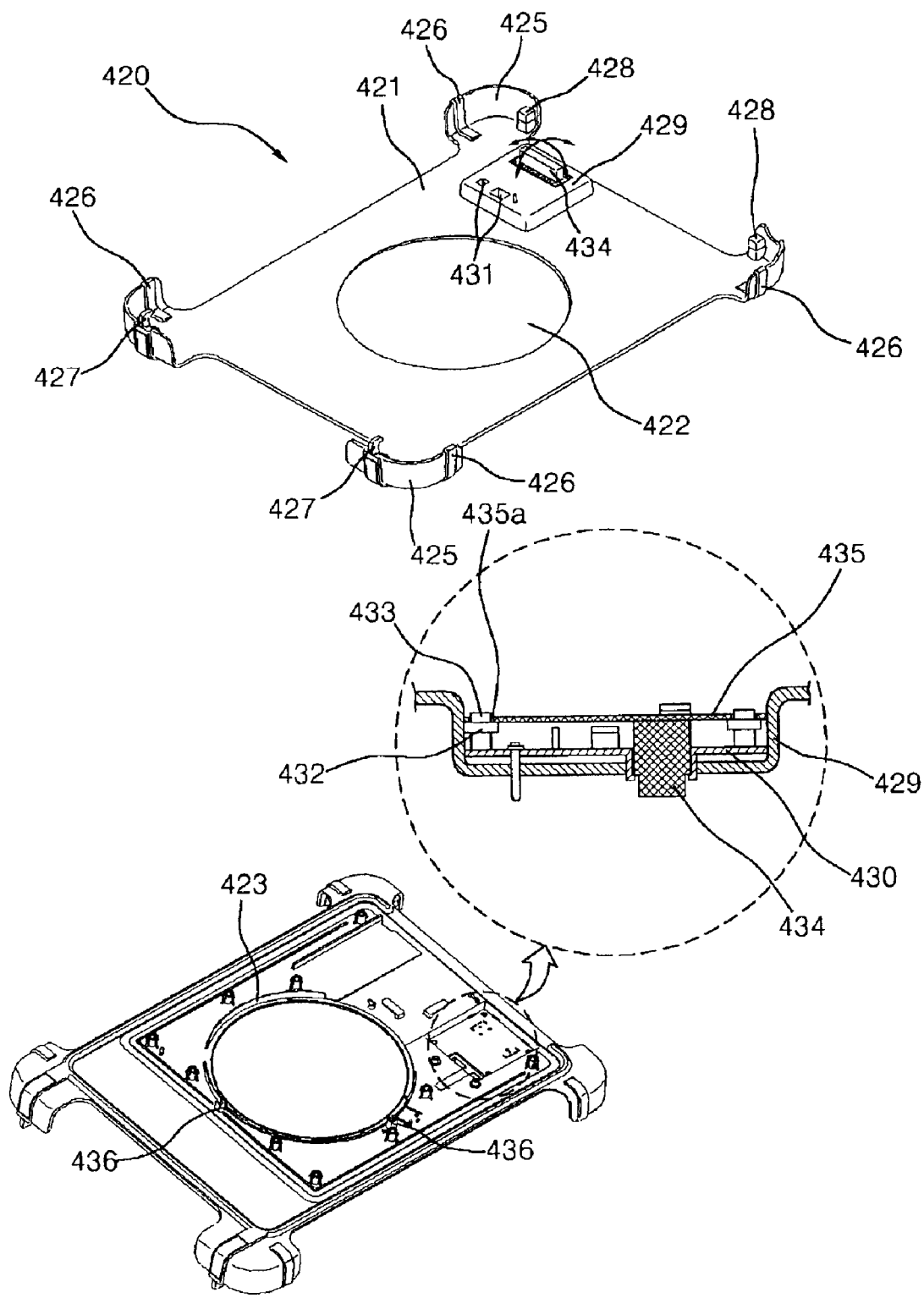

PORTABLE COMPUTER AND METHOD

BACKGROUND OF THE INVENTION

1. Field of the Invention

The present invention relates to a portable computer system.

2. Background of the Related Art

As more business is being handled outside the office, people prefer a notebook personal computer (PC) to a desktop PC or a personal digital assistant (PDA) because the notebook PCs are more convenient to carry out and operate outside of the office with high functionality. A related art desk top computer has large keyboards and a wide variety of peripheral devices. Large keyboards or a wide variety of peripheral devices may not be practical in the portable or mobile computer, because they may make the portable computer prohibitively large or heavy (e.g. making them ill suited for traveling).

A related art notebook PC is one main body including a system with keyboard to input text or data attached to the main body. Although the notebook PC can be carried anywhere, its weight is rather heavy and it is occasionally inconvenient to use. To reduce the total weight, a floppy disk drive (FDD) or an optical disk drive was separated from the main body, and connected to the main body only if necessary for use.

Related art personal digital assistances (PDAs) allow one to input data by using a stylus pen to tap a virtual keyboard on a display or actually write on the display. However, tapping the virtual keyboard on an extremely small screen is difficult. Further, when one writes characters on the liquid display that is normally sensitive to any type of pressure, a web pad recognizes the characters as a text. In doing so, however, the web pad makes a number of errors (e.g., character recognition error). Also, it is not easy to write document while the web pad is not being steadily supported or is moving.

Accordingly, there has been a long felt need for a computer that is mobile, but also has a capabilities of a larger keyboard and a broad range of peripheral device. The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

Another object of the present invention is to provide a multi-function type portable computer that can selectively include a web-pad type computer, a keyboard apparatus and a docking apparatus.

Another object of the present invention is to provide a keyboard apparatus that can attach to a main body of a computer system to selectively use the keyboard to input text and data.

Another object of the present invention is to provide a keyboard apparatus that reduces power consumption.

Another object of the present invention is to provide a keyboard apparatus that reduces power consumption by enabling a keypad only in an open position or by allowing a system to operate as web pad only when closed.

Another object of the present invention to provide a keyboard apparatus detachment apparatus of portable multi-type computer system that moves between a closed position using a first input device and an open position using a keyboard input device.

Another object of the present invention to provide a keyboard apparatus detachment apparatus of portable multi-type computer system that is capable of connecting the keyboard apparatus to the system's main body both backward and forward.

Another object of the present invention is to provide a multi-function type portable computer that has a docking apparatus with a stand pivotably coupled to a dock Another object of the present invention is to provide a multi-function type portable computer that has a docking apparatus with a computer rotatably and pivotably coupled to an arm and pivotably coupled to a stand.

Embodiments of the present invention relate to an apparatus that can include a web pad type portable computer, a keyboard apparatus and a docking apparatus. The keyboard apparatus can include a keyboard module with an apparatus to selectively move the portable computer between an open position with an active keyboard, an open position for the computer using a stylus type data entry and a closed position. The docking apparatus can include a dock, an arm and a stand. The dock can receive the portable computer. A stand can be pivotably attached to the dock Some embodiments may have the advantage that a portable computer can be used during travel and used as a desktop computer having a larger keyboard and a wide range of peripheral devices. In some embodiments, the display of the portable computer is used when the portable computer is docked in the dock Further, because the portable computer is pivotably attached to the dock, the display can be selectively used in a landscape mode or a portrait mode. Particularly, the dock (with the portable computer attached) may be rotatable to change the angle at which a user can view the display. Additionally, because the dock is pivotably attached to the stand, there is unique versatility of viewable options of the display of the portable computer, when it is used as a desktop computer. Further, the portable computer can be directly coupled to the docking apparatus without the keyboard apparatus.

To achieve at least the above objects and other advantages in a whole or in part and in accordance with the purpose of the present invention, as embodied and broadly described herein, there is provided a portable multi-type computer system that includes a portable computer, a keyboard assembly, wherein the keyboard assembly includes a keyboard case with an input device exposed in an upper surface thereof, and a connector mounted on the keyboard case with a plurality of pivots to detachably couple the keyboard assembly to the portable computer, and a docking station, wherein the docking station includes a dock configured to receive the portable computer, and a stand pivotably attached to the dock.

To further achieve at least the above objects and other advantages in a whole or in part and in accordance with the purpose of the present invention, as embodied and broadly described herein, there is provided a system that includes a keyboard case with an input device exposed in an upper surface thereof, a portable computer rotatably and pivotably supported by the keyboard case; and a connector mounted on the keyboard case to support the portable computer, wherein the connector includes a rotational disk that rotates around a fixed point relative to the upper surface of the keyboard case, and a hinge rigidly coupled to the rotational disk displaced a prescribed distanced from the fixed point.

To further achieve at least the above objects and other advantages in a whole or in part and in accordance with the purpose of the present invention, as embodied and broadly described herein, there is provided an apparatus that includes a portable computer, a dock configured to receive the portable computer; and a stand pivotably attached to the dock, wherein the dock is pivotably attached to the stand by a plurality of pivots.

To further achieve at least the above objects and other advantages in a whole or in part and in accordance with the purpose of the present invention, as embodied and broadly described herein, there is provided a method that includes providing a portable computer; and supporting the personal computer in a docking station, wherein the supporting the personal computer in a docking station includes receiving the portable computer in a dock, and pivotably attaching the dock to a stand.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein:

FIG. 8A is a diagram that shows a perspective view illustrating an outer appearance of a preferred embodiment of a keyboard opening/closing apparatus;

FIG. 13A and FIG. 13B are diagrams that show a system main body can be coupled to an exemplary keyboard apparatus in forward and reverse directions;

FIG. 17 is an exemplary sectional perspective view of an exemplary cradle unit;

FIG. 18 is a perspective view of exemplary components of a web pad cradle;

DETAILED DESCRIPTION OF PREFERRED EMBODIMENTS

Figure 1:
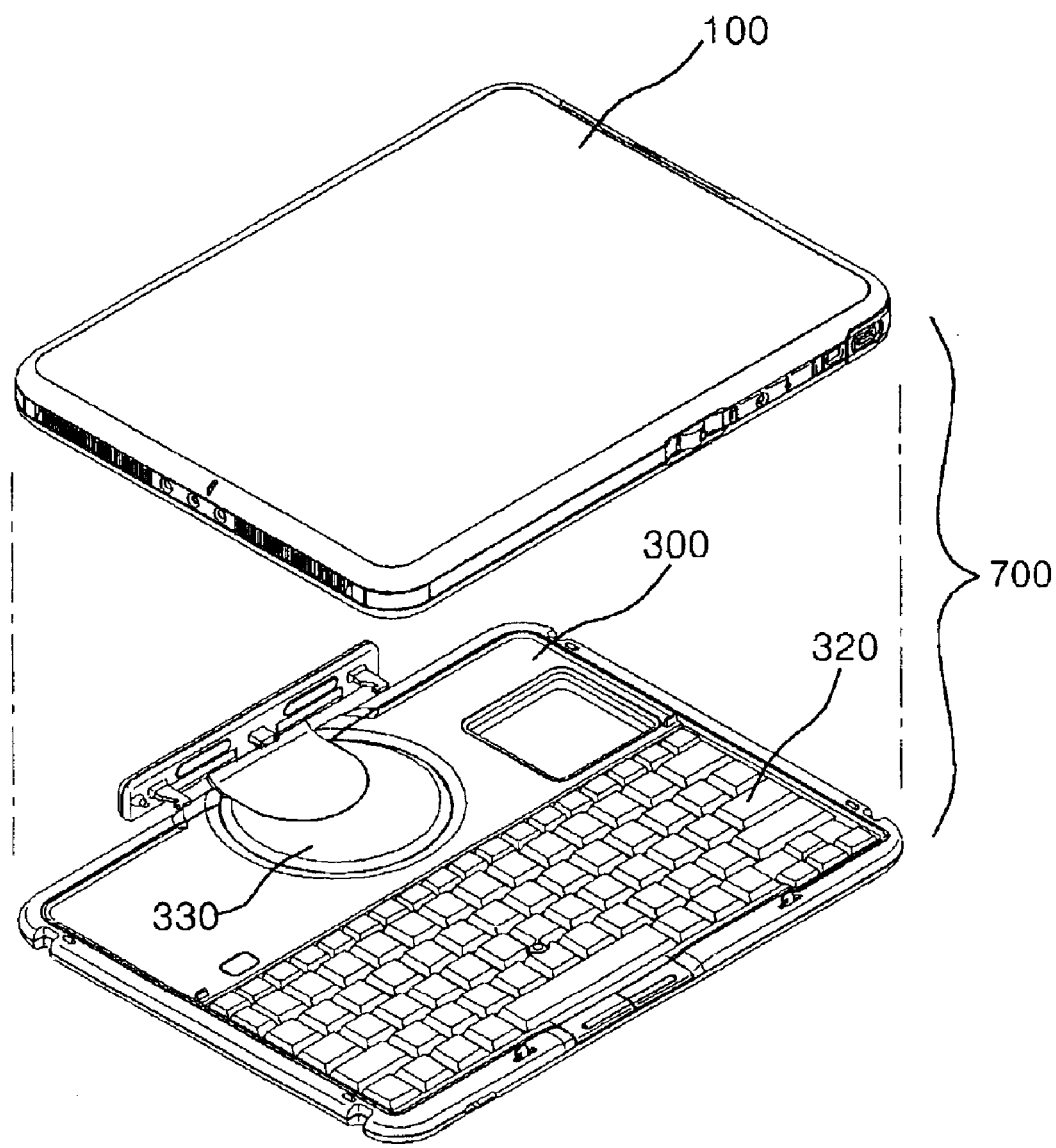
FIG. 1 is a diagram that shows a perspective view of a preferred embodiment of a keyboard apparatus according to the present invention and a main body of a system.
Figure 2:
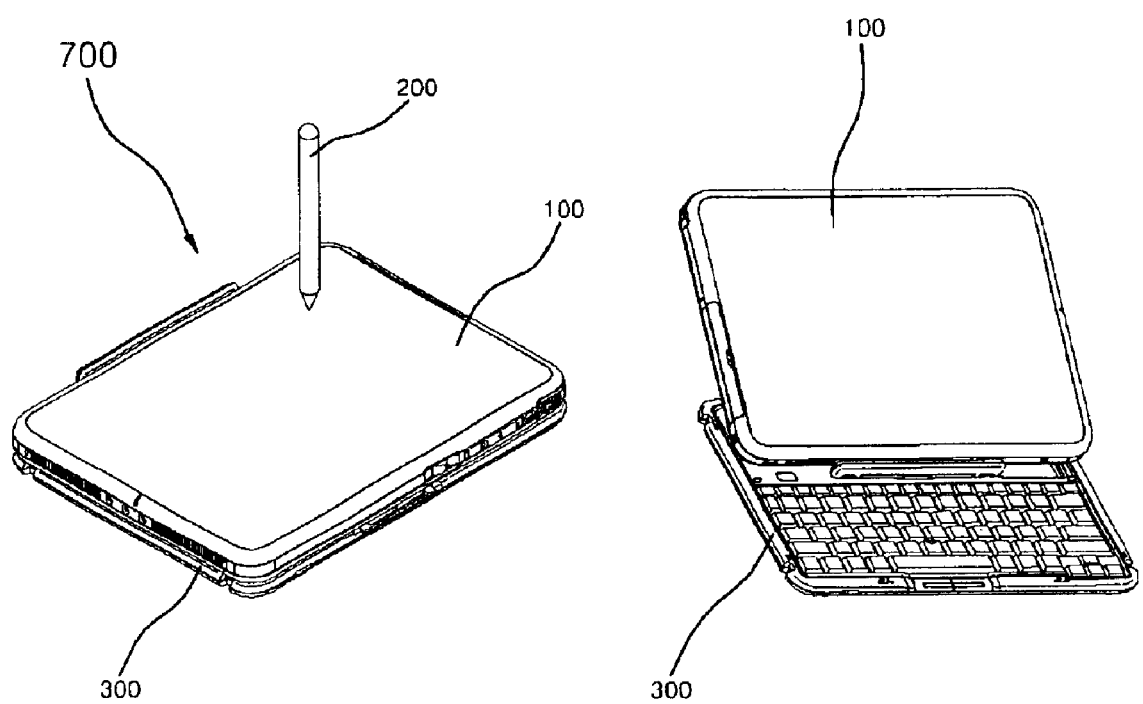
FIG. 2 is a diagram that shows a perspective view of a preferred embodiment of a keyboard apparatus according to the present invention coupled to a main body of a system.

FIGS. 1–2 are diagrams showing perspective views of a preferred embodiment of a keyboard apparatus according to the present invention that can be coupled to a main body of a system. As shown in FIG. 2, keyboard apparatus 300 is appropriate for use in a portable multi-system (e.g., web pad function and notebook PC function) computer. The keyboard apparatus 300 can be attached to a main body 100 of a system (e.g., web pad), and one can selectively use a keyboard if data or text should be input. Hence, there is no need to keep the keyboard turned on to stand by for key input after installing the keyboard apparatus 300, and as a result, power consumption can be significantly reduced. When the computer is used as a web pad, a user can detach the keyboard apparatus from the main body and carry more conveniently. However, the present invention is not intended to be so limited. For example, the web pad can be attached in a closed accessible or protected position to a keyboard apparatus and/or mounted in a docking station housing peripheral devices.

Preferred embodiments of an attachable/detachable keyboard apparatus 300 of portable multi-type computer system as shown in FIGS. 1–13B can include a keyboard case 310, a keypad 320 through which a user can input data and a rotating member 330 that enables the keyboard case 310 to rotate around main body 100 of the system, e.g., web pad, at a designated angle and that inverts the system from pen input mode using a stylus 200 to keyboard input mode that uses a keyboard through a rotation operation. A connector 343 can couple the key pad 320 to the system's main body 100 for transmitting signals having been input from the key pad 320 to the system's main body 100. A keyboard docking projection 360 can secure the keyboard apparatus 300 to the system's main body 100 to protect a display screen as desired or when the key input is not performed for an extended period of time.

A fixed projection insert hole 313 is preferably formed at one side of the keyboard case 310 for mounting on a docking system or for connecting the system's main body to a connector of a docking system, external expansion apparatus or the like, if necessary while the main body 100 can remain connected to the keyboard. Also, at the other side of the keyboard case 310, there is a plurality-of passing grooves 314 that can secure projections for the purpose of making the connection between a cradle, another expansion apparatus, and the main body of the system 100 more secure while reducing or avoiding any interference to web pad (e.g., system) securing projections.

The main body of the system 100 preferably has a display at one front surface and a battery cover (not shown) at its opposing rear surface. Except the display and the rear, the other four edges are all sides. Preferably, one side of the main body 100 includes a plurality of keyboard docking projection insert holes (not shown in FIGS. 1–2) for coupling to the keyboard apparatus 300.

Figure 3:
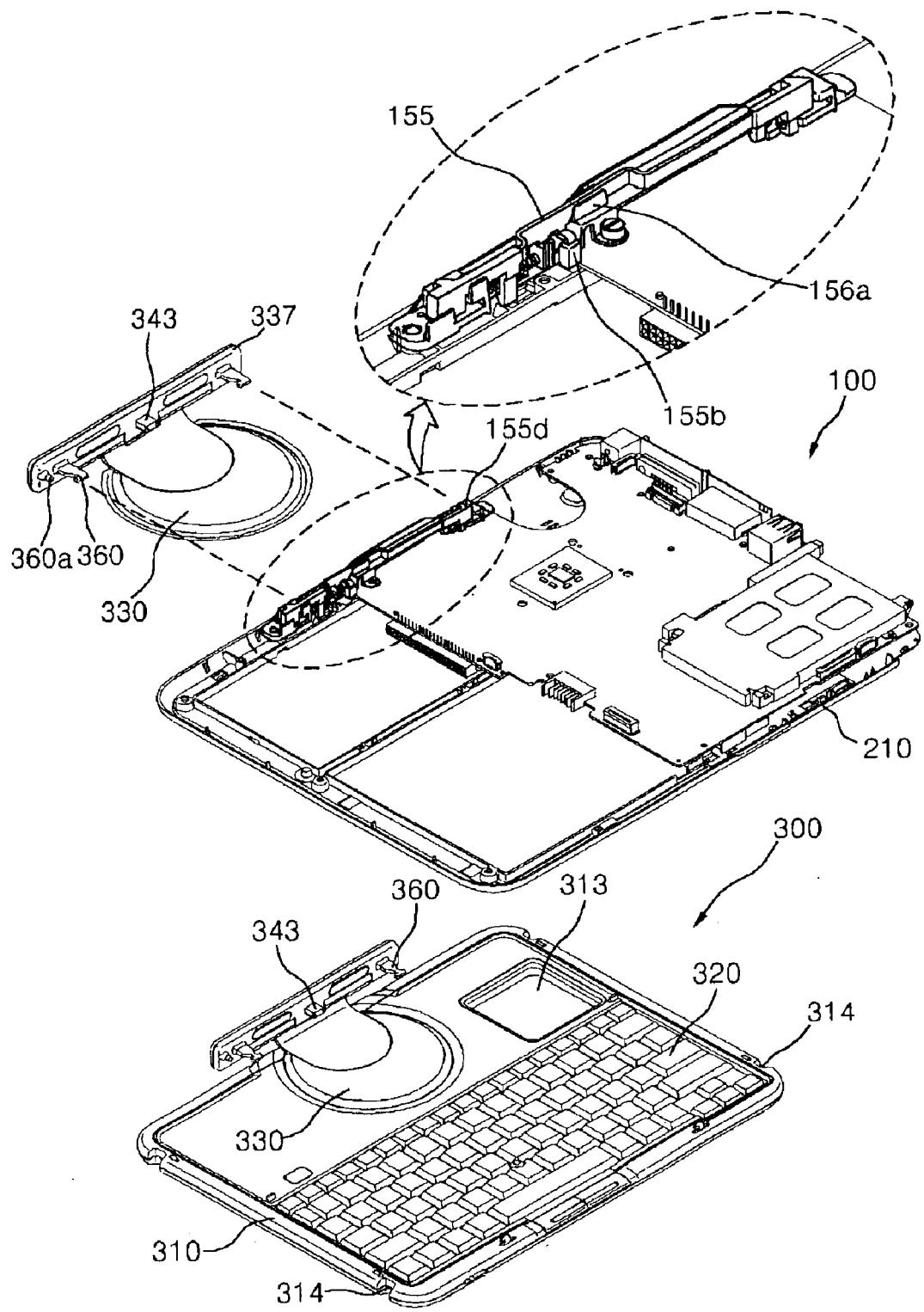
FIG. 3 is a diagram that shows a preferred embodiment of a keyboard apparatus according to the present invention for connection to a main body of a system.

Through a keyboard docking projection insert hole, the male connector 343 and keyboard docking projection 360 can be inserted and fixated with a prescribed movement. More specifically, if a user wants to connect the keyboard 300 to the main body 100 of the system, the user should pass the keyboard docking projection 360 through the keyboard docking projection insert hole, and then lock in a locking projection detaching side preferably at the end of a first frame 155 as shown in FIG. 3.

There can be a reverse-insertion preventing mechanism such a reverse-insertion preventing projection 360a nearby the keyboard docking projection 360, and a groove (not shown) at an opposite side of the main body 100, through which the reverse-insertion preventing projection 360a can pass. In this manner, the display is preferably coupled, facing outward from the system's main body 100 while the rear of the main body is not turned to the outside.

However, reverse insertion can be allowed, and the reverse-insertion preventing projection 360a does not have to be formed. In such case, the display surface of the system could be set up to face the outside, or the display surface could face the key board apparatus with the rear of the system 100 facing outward.

FIG. 2 represents the keyboard apparatus 300 coupled to the main body 100 of the system. FIG. 3 is a diagram that shows a sectional perspective view of parts of the keyboard apparatus 300 according to the present invention.

Figure 4:
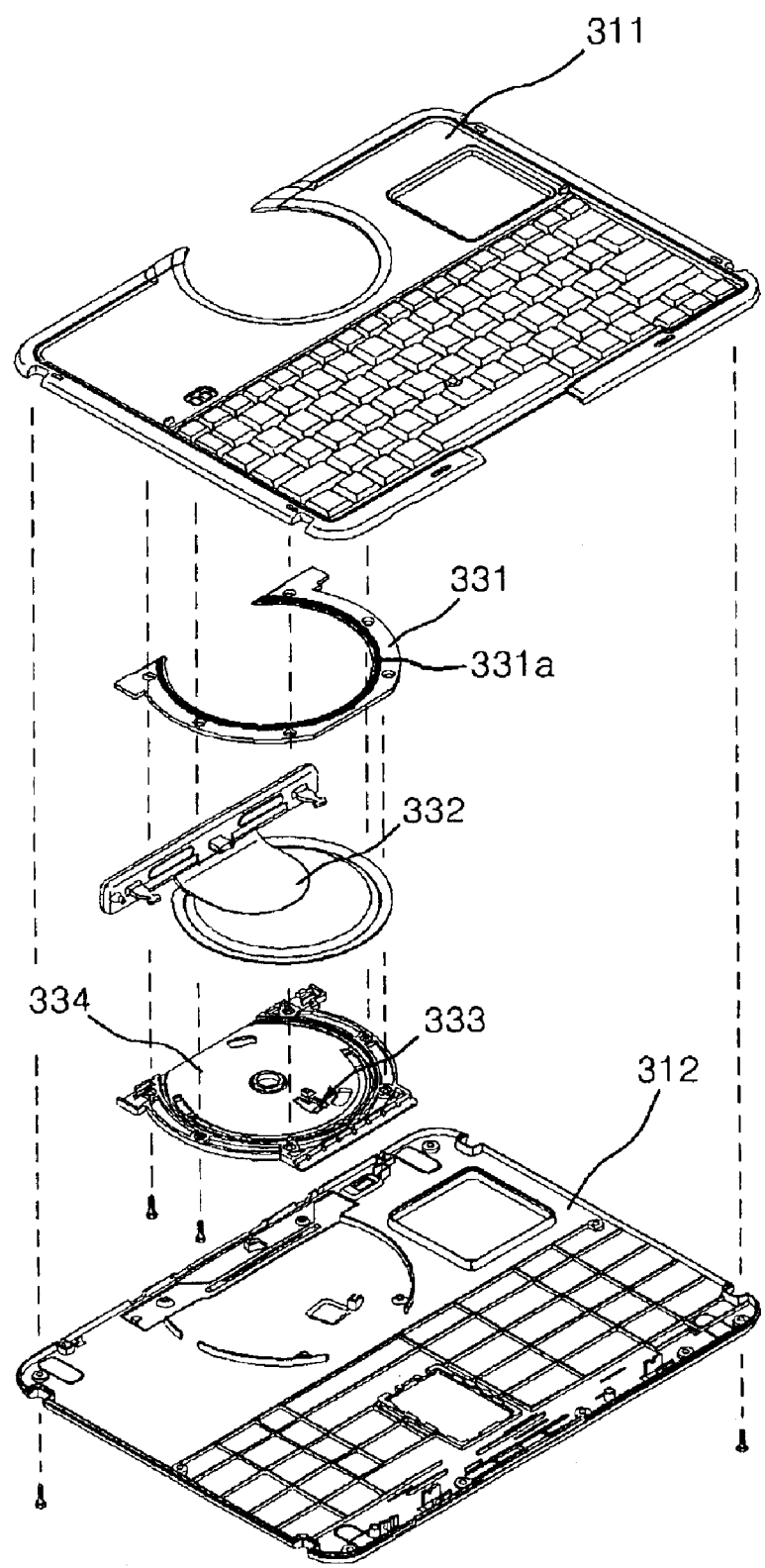
FIG. 4 is a diagram that shows a perspective view of parts of a preferred embodiment of a keyboard apparatus according to the present invention.

As shown in at least FIGS. 3–4, a type of rotating member 330 can be employed to rotate the system's main body 100 around the keyboard apparatus 300 at a designated angle. Preferably, the rotating member 330 is secured on the rear of a front case 311 for better rotation. The rotating member 330 can include an upper rotation guide member 331 disposed at the rear surface of the front case 311, a keyboard disk assembly 332 that rotates along a guide rail 331a formed on the rear surface of the upper rotation guide member 331 and a lower rotation guide member 334 for fastening the upper rotation guide member 331 and the keyboard disk assembly 332 preferably to a boss formed on the rear surface of the front case 311. The lower rotation guide member 334 can include a data input mode inverting switch 333 at a certain position of the front surface.

The guide rail 331a formed on the rear surface of the upper rotation guide member 331 is preferably a projected guide surface with a concentric circular shape. However, the present invention is not intended to be so limited. The guide rail 331a should allow rotation relative to the guide surface formed on the upper surface of the lower rotation guide member 334 while coming in contact with the guide surface at the same time. The boss on the rear surface of the front case 311 can go through a certain position of the upper rotation guide member 331 on which a plurality of through holes 334 is formed to make the upper rotation guide member 331 better supported by the boss.

Figure 5:
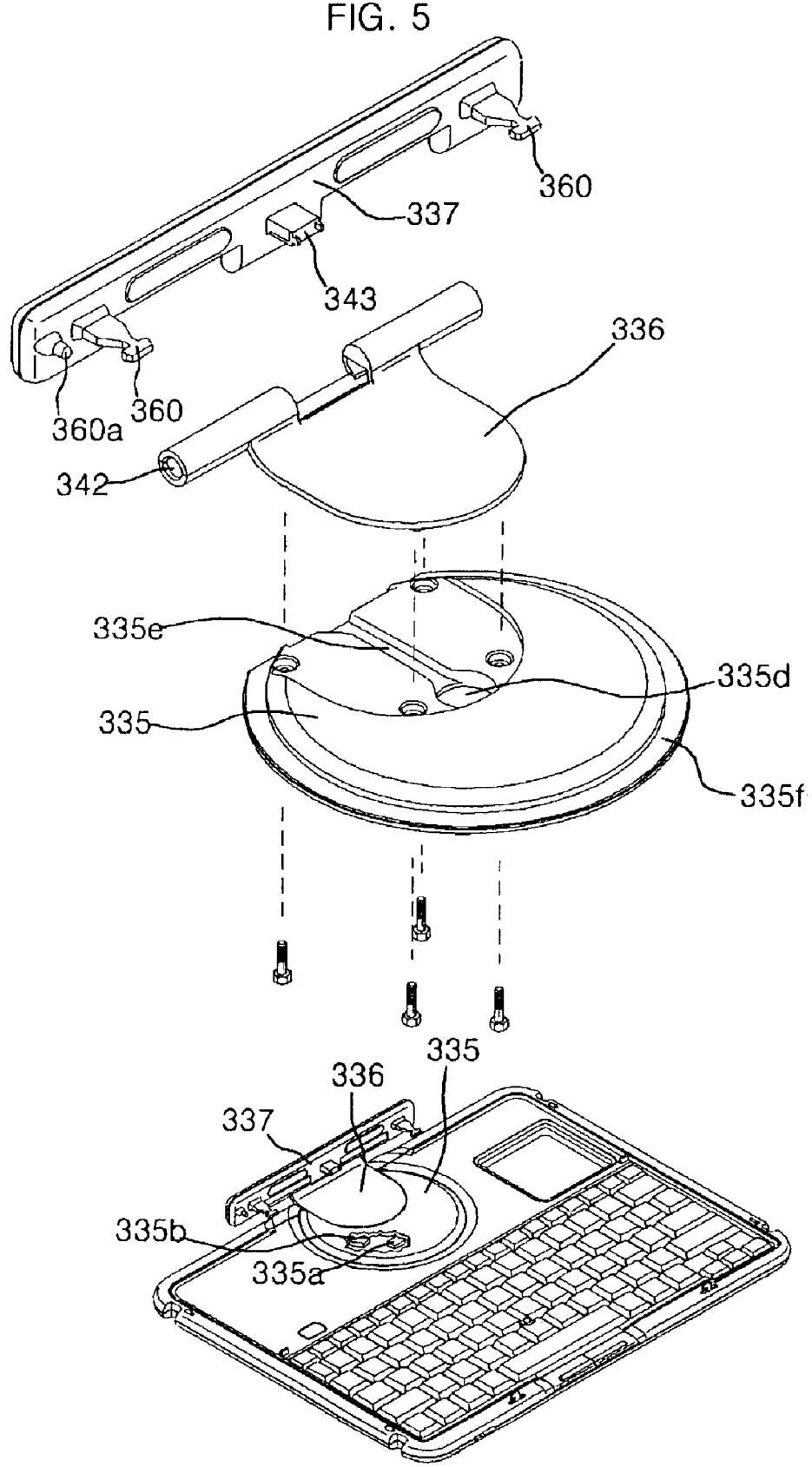
FIG. 5 is a diagram that shows an outer appearance of an exemplary keyboard disk assembly and parts thereof.
Figure 6:
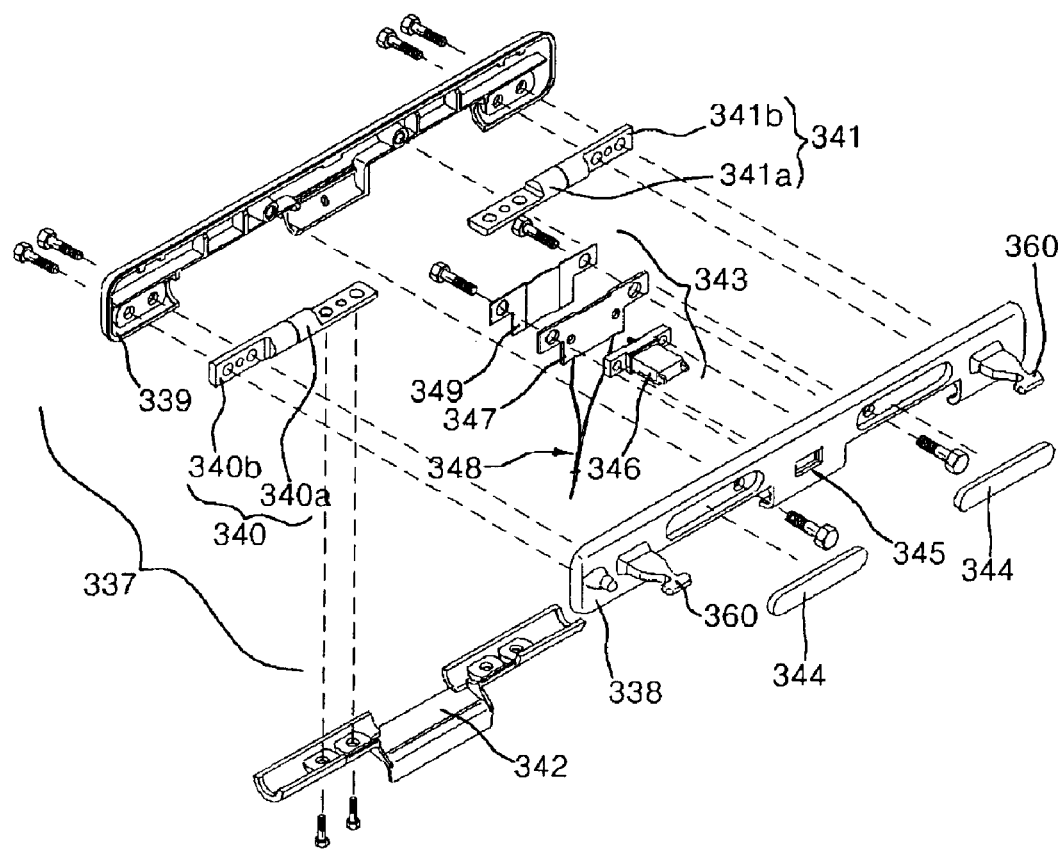
FIG. 6 is a diagram that shows parts of an exemplary hinge assembly.

FIG. 5 is a diagram that shows an outer appearance of an exemplary keyboard disk assembly and functionally decomposed parts of the exemplary keyboard disk assembly. FIG. 6 is a diagram that shows a decomposition of parts of an exemplary hinge assembly.

As shown in FIGS. 5–6, the keyboard disk assembly 332 is set up to securely rotate along a guide rail 33a formed on the rear surface of the upper rotation guide member 331. The keyboard disk assembly 332 includes a keyboard disk 335 that rotates along a guide rail 331a formed on the rear surface of the upper rotation guide member 331. The keyboard disk 335 can include a projection 335a on the rear side that can contact with a data input mode inverting switch 333 along the rotation, a hinge frame 336 being screwed onto the keyboard disk 335, and a hinge assembly 337 that rotates at one side of the hinge frame 336.

The hinge assembly 337 further can include a first connector cover 338; a second connector cover 339 on an opposite side to the first connector cover 338 and a first and second hinges 340 and 341 disposed between the first connector cover 338 and the second connector cover 339 being fastened (e.g., screwed) at both ends thereof. A hinge cover 342 can fasten the first and second hinges 340 and 341 (e.g., with hinged sections 340a, 340b and 341a, 341b) onto the hinge frame 336, and at the same time cover them.

FIG. 6 shows exemplary internal/external couplings. The hinge frame 336 can be screwed down to the upper end of the keyboard disk 335, and the hinge assembly 337 is coupled to the edge of the upper end of the hinge frame 336 in such manner that the hinge assembly 337 may rotate between the keyboard apparatus 300 and the system 100 of the system at a designated angle.

The first connector cover 338 and the second connector cover 339 on the hinge assembly 337 are preferably screwed onto each other while facing each other. A rubber bumper 344 can be adhered to part of the screw including the screw head, making the outer appearance thereof attractive.

In addition, male connector 343 for accessing/transmitting input signals from the keyboard apparatus 300 to the system's main body 100 is preferably installed close to the center of the hinge assembly 337. The male connector 343 is attached in such way that the male connector 346 faces the front side bypassing through a male connector hole 345 from the rear of the first connector cover 338. Usually, the male connector 346 is fastened (e.g., soldered) up onto a small-sized auxiliary print circuit substrate 347, and a signal cable 348 for transferring input signals from the keyboard apparatus 300 to the main body 100 is coupled to one side of the auxiliary print circuit substrate 347. The auxiliary print circuit substrate 347 can be assembled/secured onto the boss on the rear surface of the first connection cover 338, being resiliently supported by a separate plate spring 349.

The male connector 346 being assembled/secured onto the first connector cover 338 preferably can move to every direction, namely up and down, and right to left. Such a connector can simplify connection of the keyboard apparatus 300 to the system main body 100, and reduce or prevent any possible damage on each connector as the keyboard is coupled to an arm connector, which is an opposite part to the male connector 346, guiding both opposite sites to be bonded together.

The other end of the signal cable 348 can be guided by a cable guide groove 335e that is formed on the keyboard disk 335, and pass through a cable through hole 335d that is formed on the central part of the keyboard disk 335. The signal cable 348 eventually can be coupled to a print circuit substrate (not shown) mounted in the keyboard apparatus.

At certain places of the rear of the keyboard disk 335, there is preferably formed first and second projections 335a and 335b. These projections enable the data input mode inverting switch 333, which can be secured at an upper opposite position to the lower rotation guide member 334, to preferably drive an inverting lever, thereby preferably realizing inversion from data input mode using keyboard to data input mode using a stylus pen or the like. The data input mode inverting switch 333 can be electrically coupled to the print circuit substrate (not shown) of the keyboard apparatus.

After the keyboard disk assembly 332 is coupled to the upper rotation guide member 331 using a guide groove 335f, enabling them to rotate with each other, it is fastened using the lower rotation guide member 334 onto the rear surface of the front case 311. Thus, the front case 311 can be attached (e.g., screwed) with the rear case 312.

Figure 7:
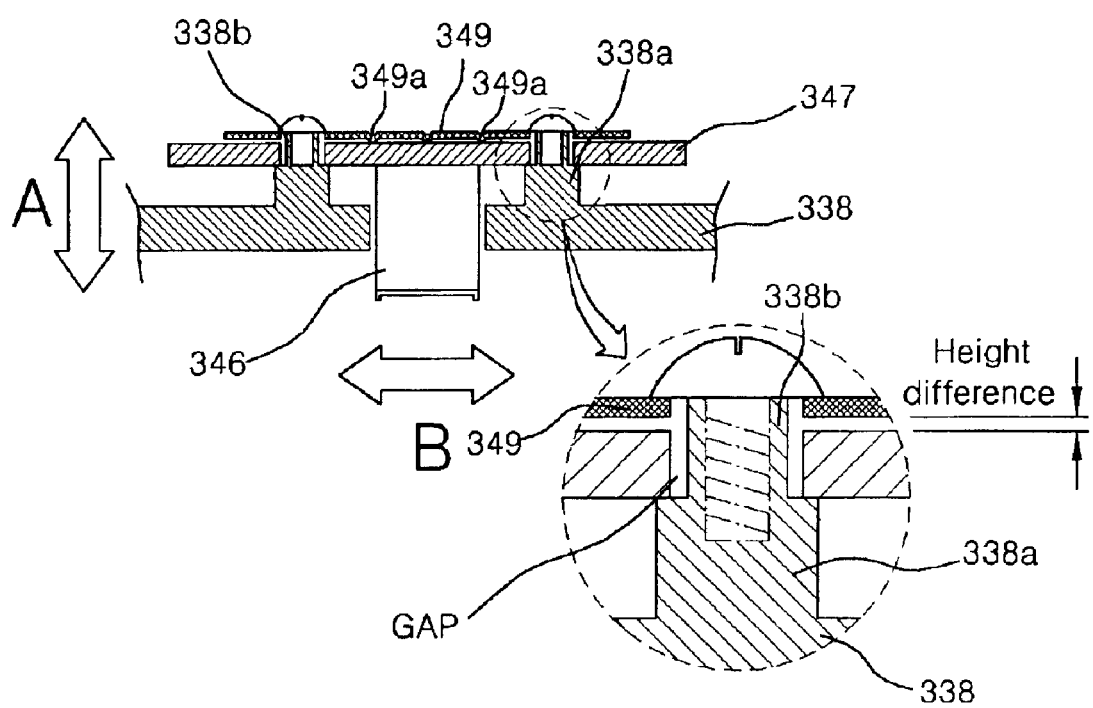
FIG. 7 is a diagram that shows a male connector coupled to a first connector cover.

FIG. 7 is a diagram that shows an exemplary coupling between a male connector and a first connector cover. As shown in FIG. 7, the boss, which is formed on the rear surface of the first connector cover 338 for facilitating the male connector 346 to move around, has two steps. A second step 338b with an internal arm screw is screwed onto the center of a first step 338a at the auxiliary print circuit substrate 347. Preferably, height of the second step 338b is greater than sum of thicknesses of the auxiliary print circuit substrate 347 and the plate spring 349, and external size of the second step 338b is smaller than the screw hole on the auxiliary print circuit substrate 347. In this manner, the auxiliary print circuit substrate 347 can move to every direction, i.e., back and forth (e.g., A direction) and right to left (e.g., B direction), receiving elasticity of the plate spring 349 even after the printed circuit substrate 347 is screwed down.

Further, a spring projection 349a is formed on the rear surface of the plate spring 349. Preferably, the projection is directed to the first connector cover 338 in order to secure the auxiliary print circuit substrate 347 always to the first step 338a by the plate spring 349.

Figure 8B:
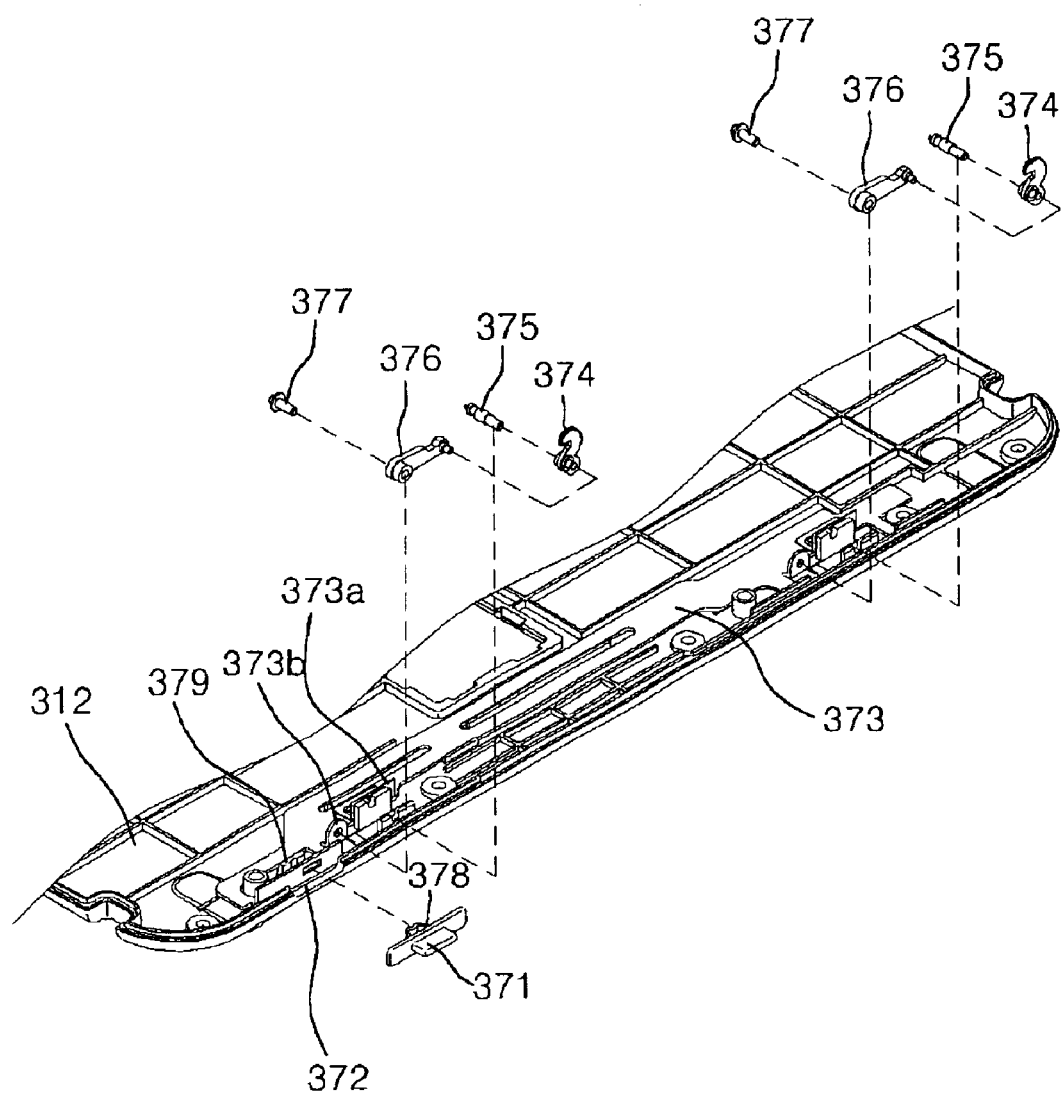
FIG. 8B is a diagram that shows a sectional perspective view of components of a preferred embodiment of a keyboard opening/closing apparatus.
Figure 8C:
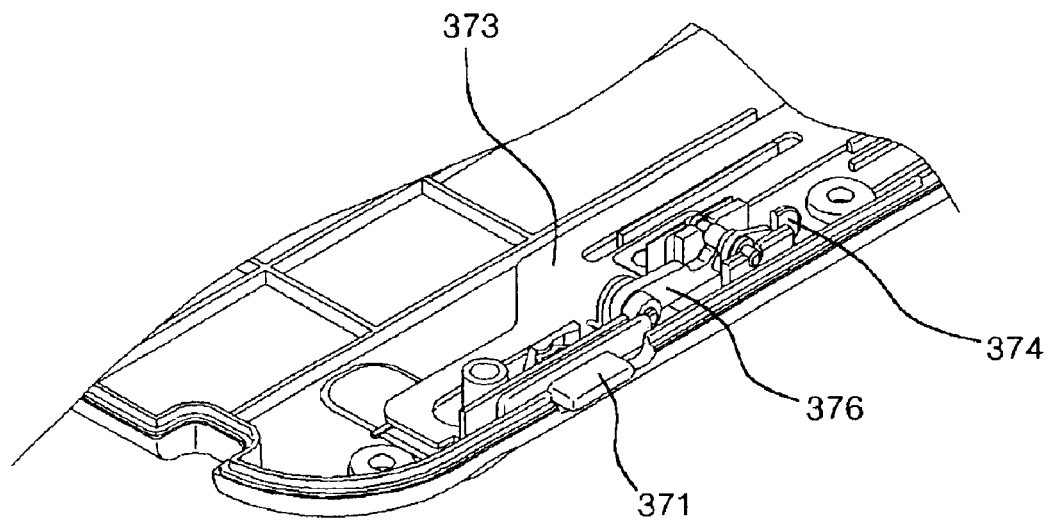
FIG. 8C is a diagram that shows a position where a projection of the main body is operated before operating a preferred embodiment of a keyboard opening/closing apparatus.
Figure 8D:
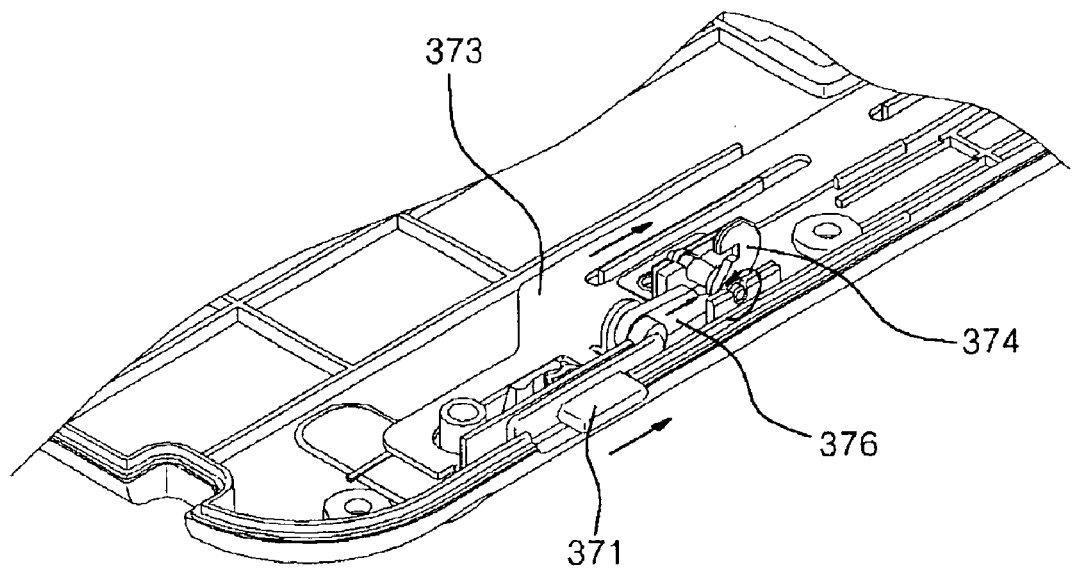
FIG. 8D is a diagram that shows a position where a projection of the main body is operated after operating a preferred embodiment of a keyboard opening/closing apparatus.
Figure 8E:
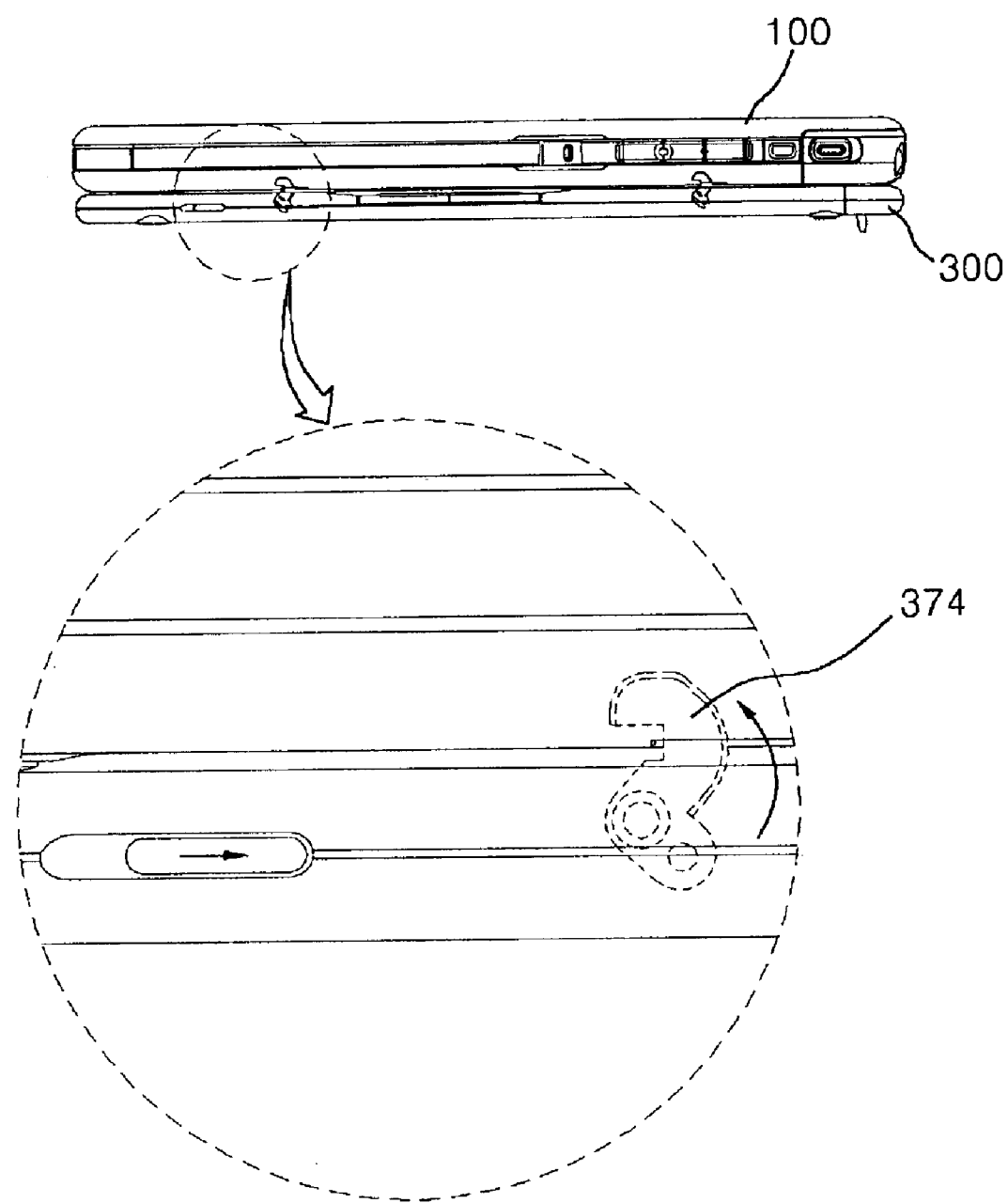
FIG. 8E is a diagram that shows a state of a system after a preferred embodiment of a keyboard opening/closing apparatus is connected to a main body.

FIG. 8A is a diagram that shows a perspective view illustrating the outer appearance of an exemplary keyboard opening/closing apparatus. FIG. 8B is a sectional perspective view diagram showing major components of the exemplary keyboard opening/closing apparatus. FIG. 8C is a diagram showing a position of a projection of the main body before operating the keyboard opening/closing apparatus. FIG. 8D is a diagram showing a position of a projection of the main body after operating the keyboard opening/closing apparatus. FIG. 8E is a diagram that shows a position of the system after the keyboard opening/closing apparatus is properly coupled to the system main body.

As shown in FIGS. 8A–8E, a keyboard opening/closing apparatus 370 is preferably installed at one side of the front of the keyboard case 310, in order to facilitate connection and separation of the keyboard apparatus 300 to and from the system's main body 100 especially when the user wants to use the computer system that had been coupled to the keyboard apparatus 300 by folding or spreading it. More specifically, the keyboard opening/closing apparatus 370 can include a keyboard opening/closing button 371, a button receiving hole 372 formed on the keyboard case to receive the button and a first operating lever 373 that can slide right to left, being guided by a guide boss mounted on the rear case and operated by the keyboard opening/closing button 371. A main body locking projection 374 can rotate as the first operating lever starts operating.

Preferably, the main body locking projection 374 is supported by a first catching pin 375 to be able to rotate on the rear case 312. Also, a second operating lever 376 can be used to facilitate rotation of the main body locking projection 374 by the first operating lever 373. One side of the second operating lever 376 can work together with the first operating lever 373 by a second catching pin 377. The other side of the second operating lever 376 can be caught by a hole that is formed at one side of the main body locking projection 374 in order to transfer sliding motion of the first operating lever 373, and eventually enabling the main body locking projection 374 to rotate.

Further, one side of the first catching pin 375 can guide the first operating lever 373. In such case, partial end of the first operating lever 373 is pleated, and includes a guide groove to received or guide the first catching pin 375.

Preferably, two main body locking projections 374 are respectively installed on both sides of the front of the keyboard case 310, each being separated by certain distance, in order to maintain secure connection between keyboard apparatus 300 and system's main body 100. Other components for driving the main body locking projection 374 are assembled in such a manner as to cooperate together on the first operating lever 373 in accordance with opening/closing operation of the keyboard opening/closing button 371.

Operations of the main body locking projection 374 together with the keyboard opening/closing button 371 to couple the keyboard apparatus 300 with the system 100, or how these two are disconnected from each other will now be described. If the user pushes the keyboard opening/closing button 371 to the opening direction (e.g., right direction), the first operating lever 373 on the rear surface of the keyboard opening/closing button can move to the right direction also. When the first operating lever 373 slides, the second operating lever 376 moves to the right direction at the same time.

Motion of the second operating lever 376 is transferred to the main body locking projection 374 that rotates around the first catching pin 375, and the main body locking projection 374 preferably rotates counterclockwise. In this way, the main body locking projection 374 is properly secured to a sidewall of the catching groove that can be formed on the case of a main body of the system 100 as shown in FIG. 8E.

On the contrary, if the user pushes the keyboard opening/closing button 371 in a reverse direction (e.g., the left direction), the first operating lever 373 moves to the left, and eventually, the main body locking projection 374 rotates clockwise. As a result, the sidewall of the catching groove that is formed on the case of the main body 100 breaks away from the catching part on the main body locking projection 374, and the system's main body 100 can be opened from the keyboard apparatus 300.

In a final position (e.g., the main body locking projection 374 is fastened or caught by the sidewall of the catching groove on the case of the main body 100 conforming to the operation of the keyboard opening/closing button 371), a tension device such as tension unit 378 can be further installed at the rear surface of the keyboard opening/closing button 371 to lock the keyboard opening/closing button 371 to the final position. A tension unit groove 379 is installed at an opposite position to the tension unit 378 on the rear case 312. In this manner, the tension unit 378 on the rear surface of the keyboard opening/closing button 371 can preferably be safely locked to the tension unit groove 379, and, the keyboard opening/closing button 371 can be locked to its final position. Hence, when the main body and the keyboard are closed, the keyboard opening/closing button 371 remains locked, so the main body locking projection 374 cannot easily be separated from the catching groove on the case of the system 100 as shown in FIG. 8E.

When the user wants to open a keyboard apparatus such as keyboard apparatus 300 that is interlocked to the main body of the computer system 100, given that the user had been carrying the computer system coupled with the keyboard apparatus 300 or the user had been using the computer system 100 (e.g., web pad), the user can operate the keyboard opening/closing button 371 and open (e.g., unfold) the web pad main body 100 around the hinge assembly 337 of the keyboard apparatus 300.

Figure 9A:
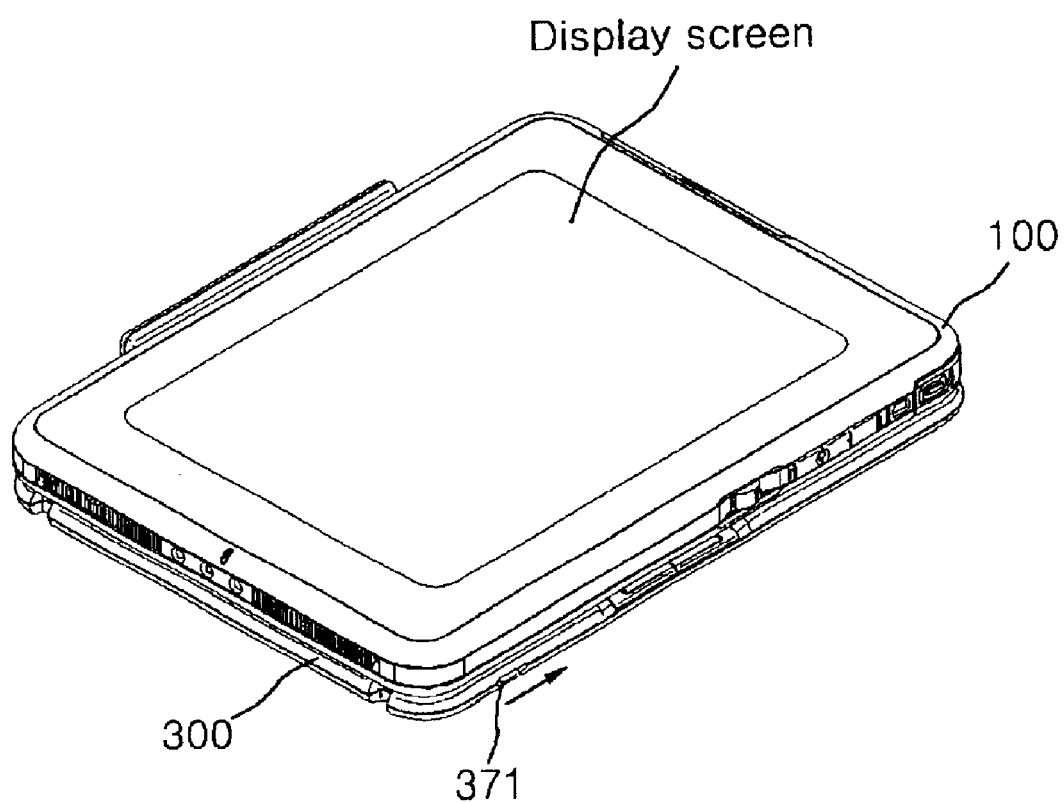
FIGS. 9A through 9C are diagrams that show exemplary operations of opening and inverting a preferred embodiment of a keyboard apparatus.
Figure 9B:
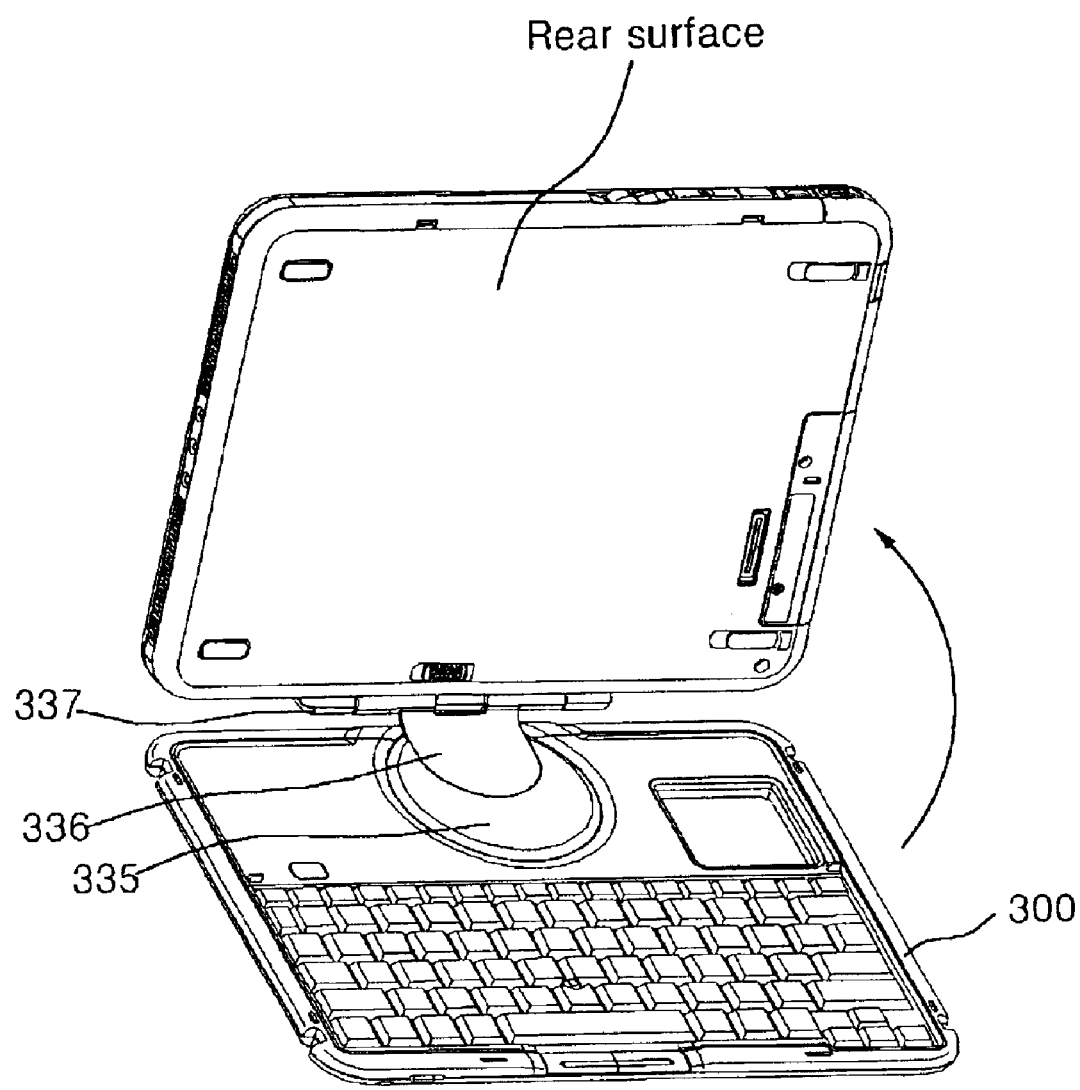
Figure 9C:
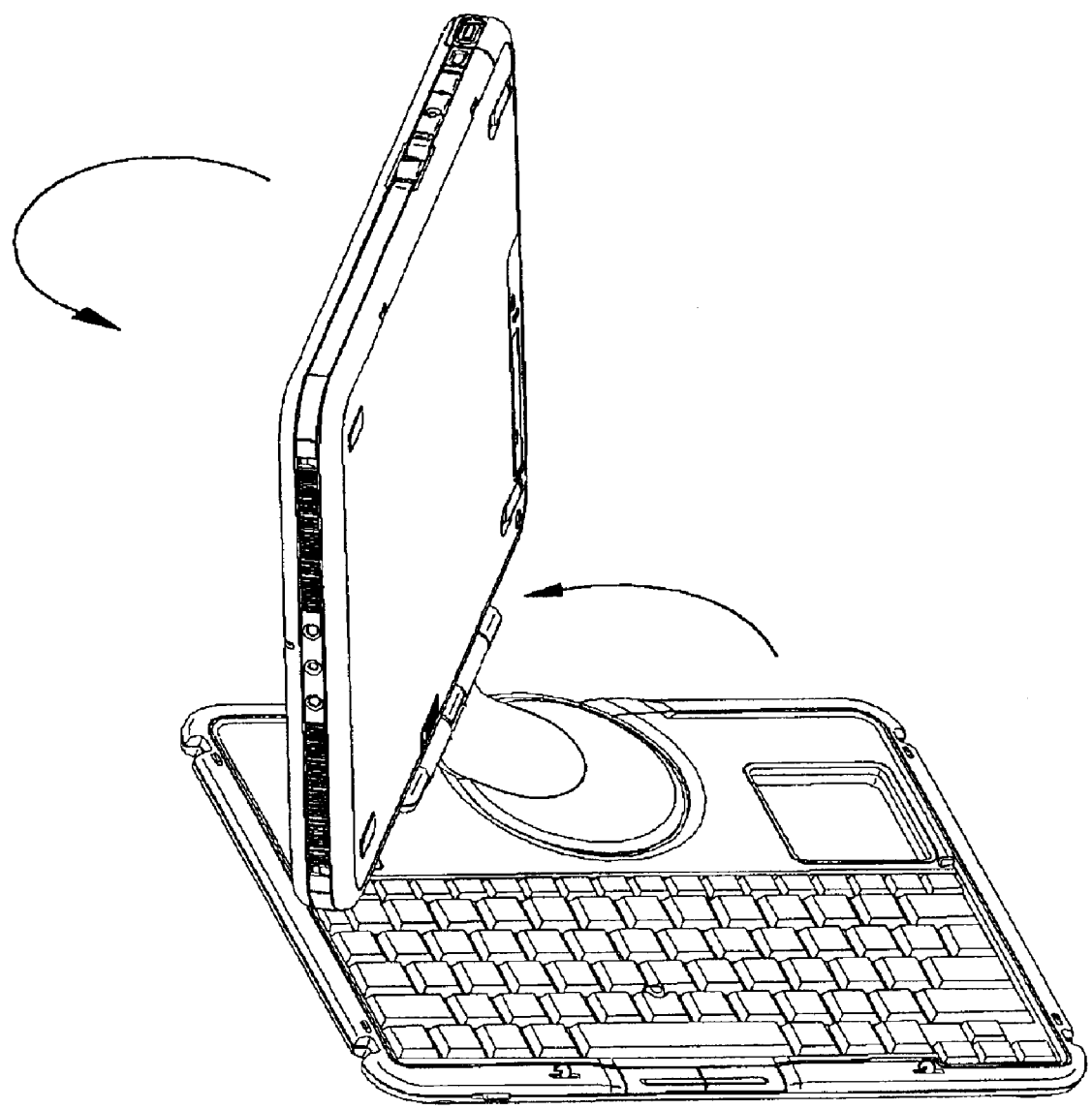

In such a case, the user comes to face the rear surface of the system main body 100, not a display screen or touch screen. Therefore, it is necessary to secure the position of the display screen by rotating it (e.g., counterclockwise) to face the user (refer to FIGS. 9A, 9B, and 9C). Exemplary operations from a closed position to any open position are shown in FIGS. 9A–9C.

Rotation of the system main body 100 including the display screen preferably works together with the rotary keyboard disk assembly 332 on the keyboard case 310 of the keyboard apparatus 300. To rotate the main body 100 having been opened from the keyboard apparatus 300 toward the user's direction, the user preferably needs to rotate the system main body 100, (e.g., 180 degrees) along the rotation direction of the keyboard disk assembly 332, for example, supposing that the keyboard apparatus 300 is placed on a desk.

When the user uses the computer while carrying the computer system where the keyboard apparatus 300 is coupled to the system's main body 100, the computer system can perform web pad functions only (e.g., display surface facing out). This is because data input using keypad 320 is preferably not possible when the keypad 320 has not been exposed to the outside, and control unit in the system main body 100 prohibits data input through keyboard if the keyboard apparatus 300 and the main body 100 are coupled to each other in the closed position.

Figure 10:
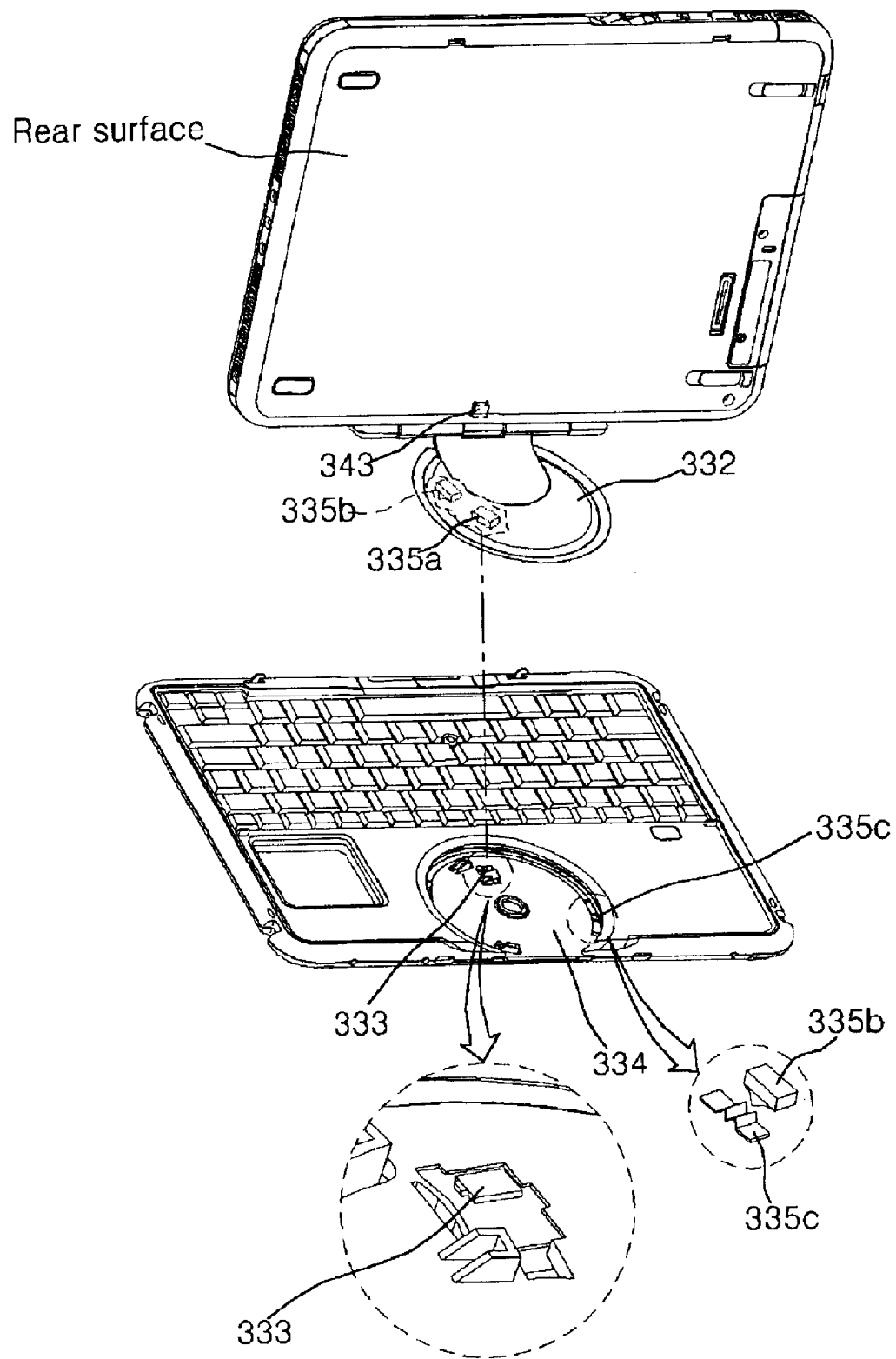
FIG. 10 is a diagram that shows a sectional perspective view depicting components of an exemplary rotation detecting apparatus.

FIG. 10 is a diagram that shows a sectional perspective view of components of a rotation detecting apparatus according to a preferred embodiment. As shown in FIG. 10, when the user opens the system main body 100 preferably around the hinge assembly 337 of the keyboard apparatus 300 by operating the keyboard opening/closing button 371, and preferably rotates the system main body 100 at about 180 degrees along the rotation direction of the keyboard disk assembly 332, the main body 100, through a rotation detecting apparatus that can be mounted using the rotating member is preferably converted a data input mode using a keyboard. The rotation detecting apparatus can be secured at the rear surface of the rear case 312. The rotation detecting apparatus can include a lower rotation guide member 334 with a data input mode inverting switch 333 being fixated at a prescribed position on the front surface that faces the rear case 312, a keyboard disk assembly 332 and the male connector 343. The keyboard disk assembly 332 is disposed between the front case 311 and the lower rotation guide member 334 and coupled so that it can rotate along the guide groove formed on the lower rotation guide member 334, including a projection 335a that is coupled to the main body and generates a switching signal by contacting the data input mode inverting switch 333 when the main body rotates by a prescribed amount or to a certain angle. The male connector 343 can transfer the switching signal of the data input mode inverting switch 333 to the main body of the system 100.

When the user opens the system main body 100 around a first and second hinges 341 and 342 of the keyboard apparatus 300 by operating the keyboard opening/closing button 371, and rotates the main body 100 preferably about 180 degrees along the rotation direction of the keyboard disk assembly 332, projection 335a of the rotation detecting apparatus and the data input mode inverting switch 333 come in contact with each other. As a result, a switching signal is preferably generated. The switching signal is then sent to a control unit (not shown) of the main body 100 through the male connector 343. In conforming to the switching signal, the main body 100 of the system switches to the keyboard input mode so the user can input data by using the keyboard.

Preferably, stopping spring 335c is supported/secured (e.g., fastened) at two positions of the upper surface of the lower rotation guide member 334 to facilitate rotation of the keyboard assembly to 180 degrees. Each stopping spring 335c is fixated in such way as to maintain equal distance from the center of lower rotation guide member 334 (i.e., on the concentric circle) and maintains 180 degrees to each other. Also, a second projection 335b is formed on the rear surface of the keyboard disk 335 to oppose the stopping spring 335c fixated on the upper surface of the lower rotation guide member 334.

Operations of the stopping spring 335c and the second projection 335b will now be described. When the user rotates the main body at 180 degrees from the keyboard apparatus, the second projection 335b passes through the groove of the stopping spring 335c in accordance with the relative motion of the lower rotation guide member 334 and the keyboard disk 335 and can make a 'click' sound as it clicks to the groove. Therefore, the user does not stop rotating the keyboard apparatus 300 supporting the system 100 until he/she hears the click sound.

Figure 11:
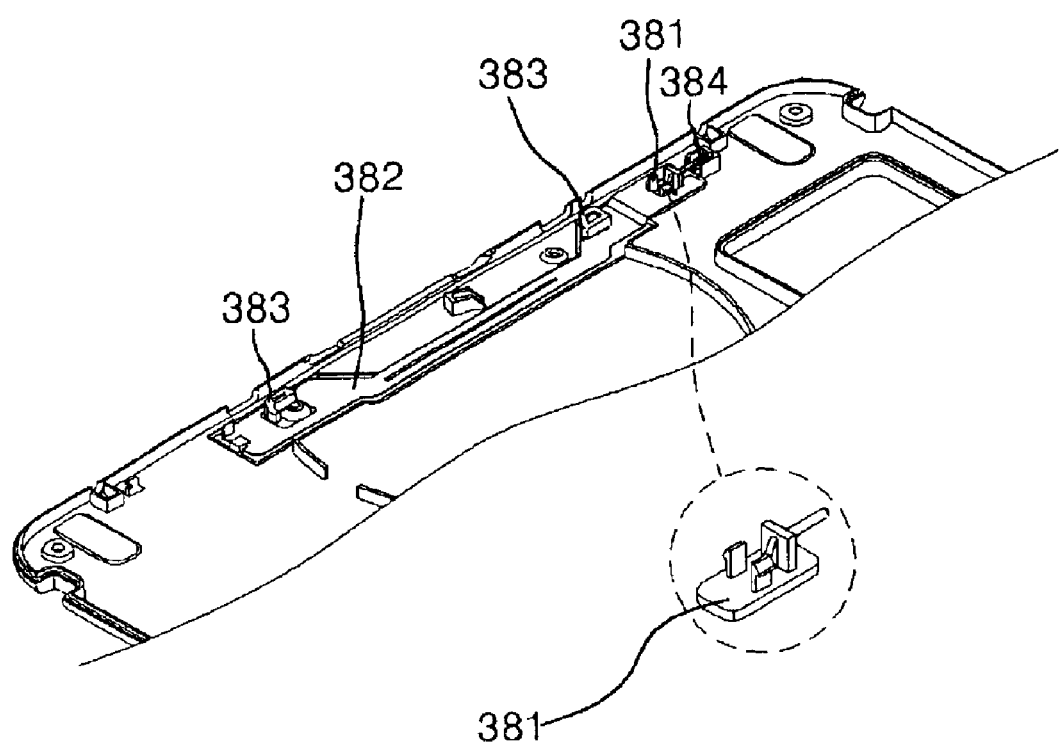
FIG. 11 is a diagram that shows a sectional perspective view of a protection cover detachment apparatus when a front case is partially cut off.
Figure 12:
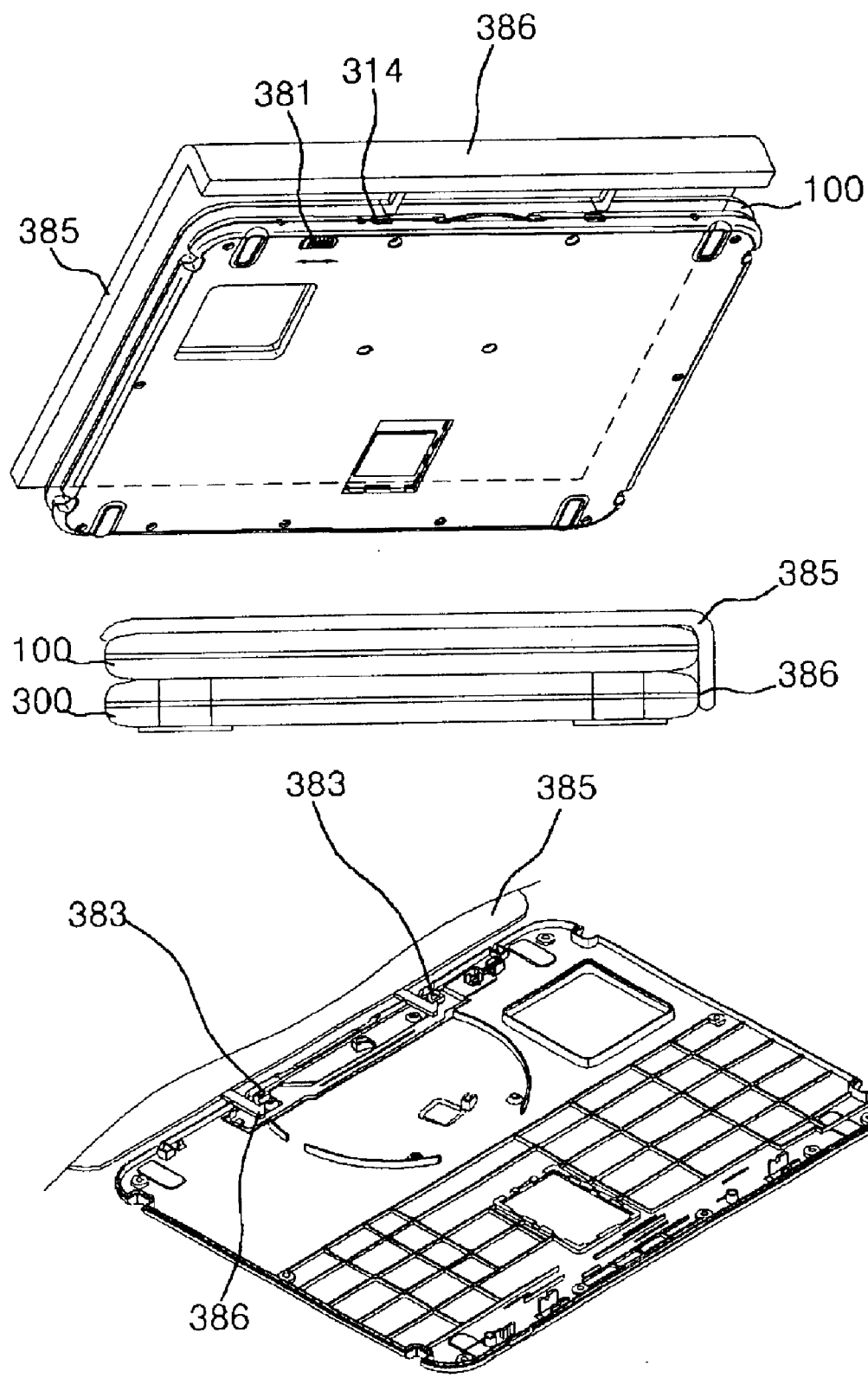
FIG. 12 is a diagram that demonstrates exemplary detachment of a protection cover.

FIG. 11 is a diagram that shows a sectional perspective view of a protection cover detachment apparatus when a front case is partially removed. FIG. 12 is a diagram that shows detaching the protection cover.

The user can find it inconvenient to carry the multi-type computer system after coupling its main body to the keyboard apparatus. When coupled, the user must worry whether the main body, especially the display screen, will be damaged by being contacted with the outside.

To reduce or prevent any possible damage on the display surface of the main body, users can use a protection cover. More specifically, a protection cover detachment apparatus could be installed at the rear side of the keyboard case 310 to protect the display or glass surface on the main body 100 from external shock especially when the user needs to carry the folded computer system having system's main body 100 coupled to the keyboard apparatus 300.

The protection cover detachment apparatus can include a protection cover 385, protection cover detachment button 381 that slides over the rear case 312, a gearing lever 382 that gears by the protection cover detachment button and a catching button 383 with a catching surface to which the protection cover clicks, gearing with the gearing lever. The protection cover detachment button 381 can be resiliently supported by the return spring 384 so it tends or always returns to an original position after operation.

The cover protection detachment apparatus preferably attaches or clicks to the protection cover 385 to protect the glass surface of the display at the one side of the main body 100 from external shock. Therefore, if the user wants to carry the main body 100, he/she needs to insert a projection 386 on the protection cover 385 through the catching groove 315 that is formed on the keyboard case 310 to properly click the projection 386 to the catching button 383. On the contrary, if the user wants to take off the protection cover 385, he/she needs to push the protection cover detachment button 381 to the opposite direction, and releases the projection 386 from the catching button 383. At this time, if the user frees the catching button 383, the button preferably returns to its original position by the elasticity of the return spring 384.

Figure 13B:
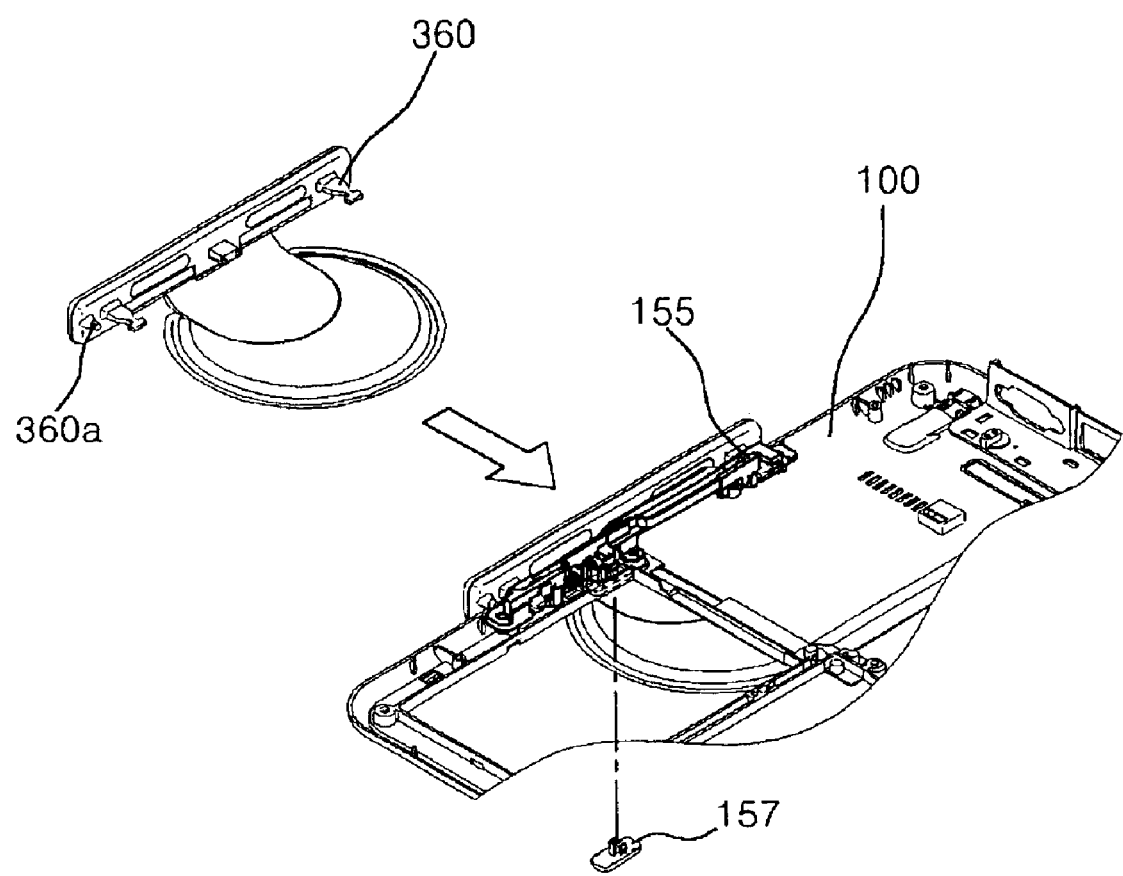

FIG. 13A and FIG. 13B are diagrams that show components and operations to couple the system's main body to the keyboard apparatus in forward and reverse directions in accordance with preferred embodiments. As shown in FIG. 13A, the display could be coupled to the system 100 to face the outside. Also shown in FIG. 13A, the system 100 can also be coupled the other way around, that is, the display could be coupled facing the keyboard apparatus, making its rear surface face the outside. The former is convenient in that users can input data directly in the display surface by using stylus pen and then see the input results. On the other hand, the latter has a merit in that users can keep the display surface from being damaged.

The forward/backward connection of the keyboard apparatus 300 to the main body 100 can be made, for example, by forming one or more projections on the end of keyboard docking projection 360 to work in both directions, thereby allowing the keyboard docking projection 360 to couple to the first frame in both directions. As shown in FIG. 13B, the keyboard docking projections 360 can work with the keyboard separating lever 157 of the main body in both directions. However, the present invention is not intended to be so limited.

For example, the connection of the system 100 to the keyboard apparatus 300 can be formed to allow only one single orientation. To connect the system 100 to the keyboard apparatus while keeping the display screen facing the outside, there should be a reverse-insertion preventing projection 360a at one side of the keyboard docking projection 360, and one passing groove at the opposite position of the reverse-insertion preventing projection should be formed at one side of the main body for the reverse-insertion preventing projection to pass through. In this case, if one assembles the system to make the rear side of the main body 100 face the outside, the reverse-insertion preventing projection can be interfered by a main body that does not have the passing groove for the reverse-insertion preventing projection. In this case, reverse-insertion assembly of the main body to the keyboard apparatus is made impossible, and reverse-insertion is prevented.

Figure 14:
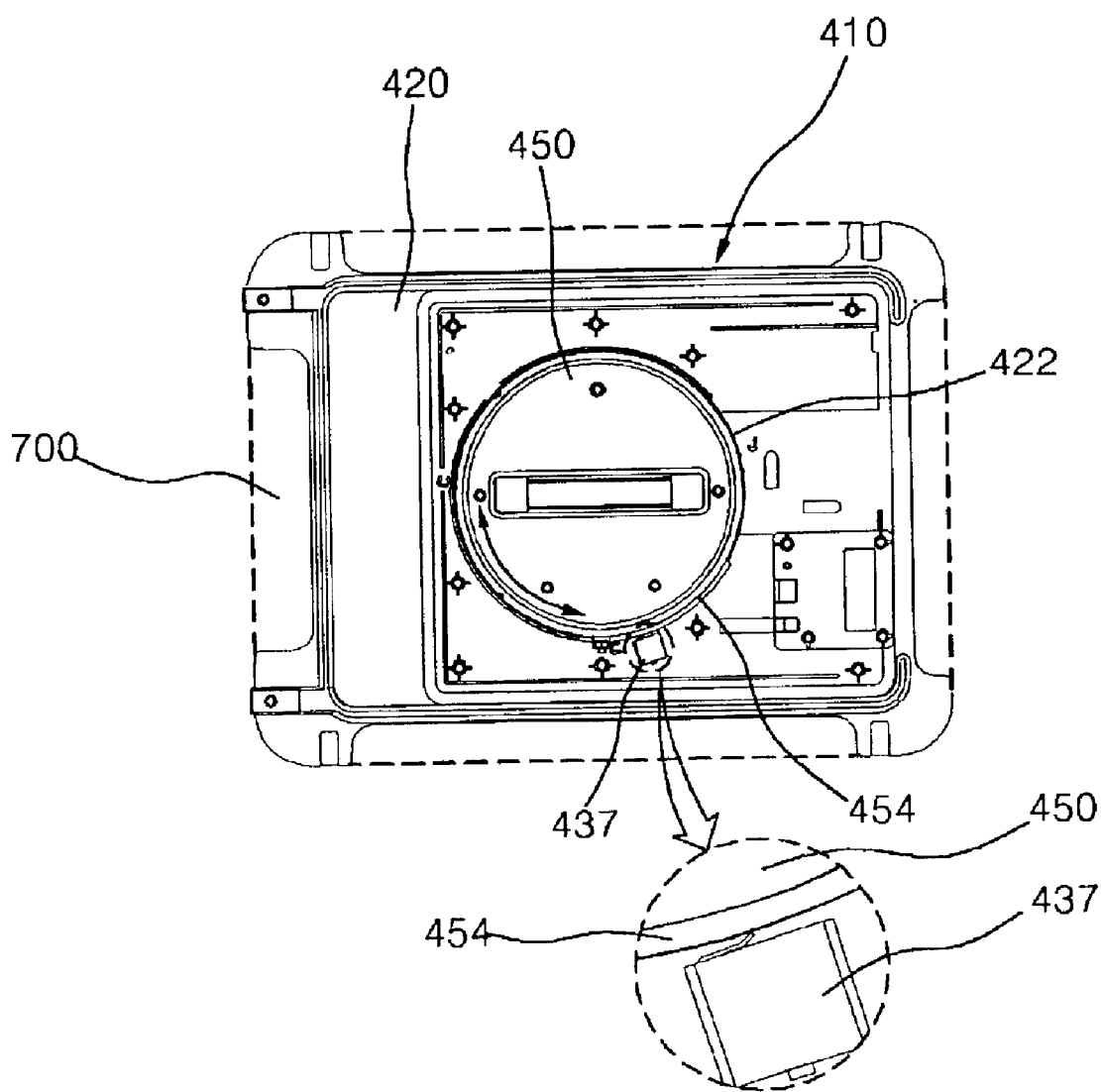
FIG. 14 is a diagram illustrating coupling of an exemplary web pad cradle and rotation guide member.

FIG. 14 diagrammatically depicts a situation in which a web pad cradle and a rotation guide member, to which a web pad system with convertible screen is applied, can be coupled to each other. The web pad system with a convertible screen mode according to embodiments of the present invention can help users to more conveniently use the computer system at any place they want, by converting the screen mode from portrait to landscape or from landscape to portrait by rotating a cradle unit 410 on which a web pad system 700 is cradled through a rotation guide member 450 at a designated angle. An orientation switch 437, which can be fixated on peripheral surface of a through hole on the rear surface of the web pad cradle and switched by rotation of the web pad cradle, can convert the screen mode of the web pad system 700 from portrait to landscape or from landscape to portrait by being switched by a circumference projection 454 of the rotation guide member 450.

FIGS. 1–2 diagrammatically depict a decomposed exemplary web pad system of a multi-type computer system being cradled in a docking station to which embodiments of the present invention can be applied. As shown in FIGS. 1–2, the web pad system 700 can include a main body (e.g., web pad) 100 having a plurality of panels and a main system, and a keyboard apparatus 300 having a key pad 320 and a rotation member 330 being coupled to central portion of a rear end. The main body 100 can be superposed to the keyboard apparatus 300 using the rotation member 330 to rotate around at a variable designated angle.

If the keyboard apparatus 300 is superposed with the web pad system 700 as described above, the user can input data in the web pad system 700 by using a stylus pen 200 as input device, for example as shown in FIG. 2. By rotating the main body 100 around the keyboard apparatus 300 being superposed on the main body 100 at a designated angle, the user can input vast amount of data because the input device of the main body 100 is preferably not the stylus pen 200 at this time, but the keyboard apparatus 300 itself, for example as shown in FIG. 2. In this case, the user can place the web pad system 700 on a desk or table, as he/she does with the conventional notebook PC, and input data more conveniently. In addition, since the main body 100 and the keyboard apparatus 300 can be superposed with each other, the user can carry the web pad system 700 more conveniently and input data by selectively using the stylus pen 200 or the key pad 320.

Figure 15:
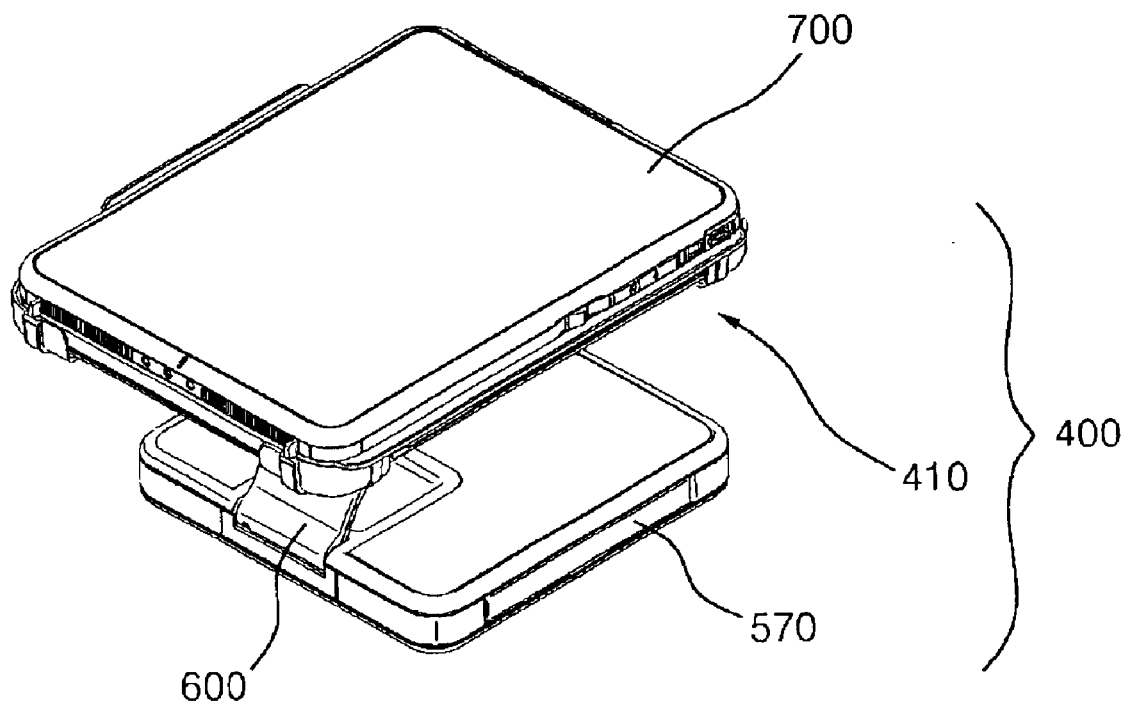
FIG. 15 is a perspective view illustrating an exemplary docking station where a web pad system is cradled on a cradle.
Figure 16A:
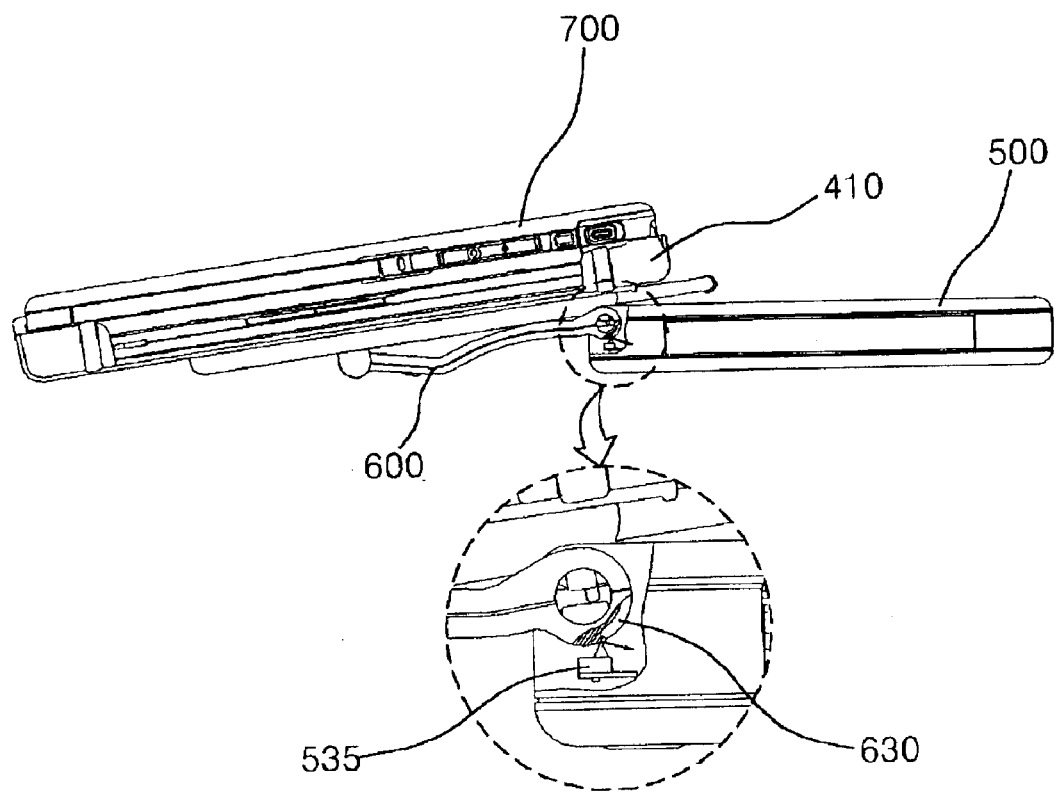
FIGS. 16A and 16B are diagrams illustrating an exemplary arm unit in operation, wherein a specific program may be for recognizing a writing function of a stylus pen which may be operated on a screen as a switch contact groove and/or a sliding switch may be switched with each other through rotation of the arm unit.
Figure 16B:
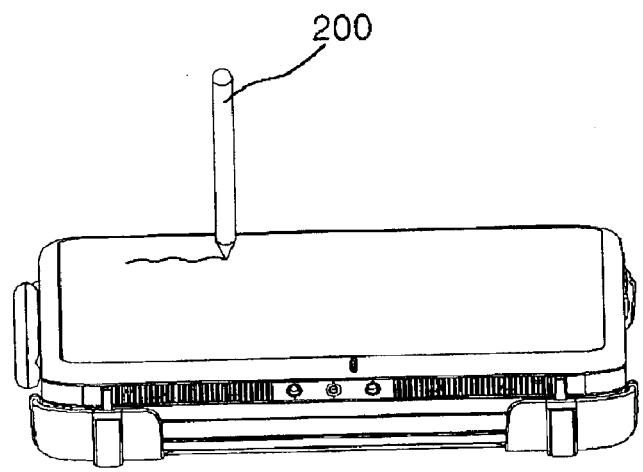

FIG. 15 is a perspective view representing an exemplary docking station where a web pad system is cradled on a cradle according to embodiments of the present invention. FIGS. 16A and 16B diagrammatically depict an arm unit in operation, wherein a specific program for recognizing a writing function of a stylus pen is being operated on a screen as a switch contact groove and a sliding switch are switched with each other through rotation of the arm unit.

As depicted in FIG. 15, the stand unit 500 preferably acts as base for supporting the web pad's weight that is cradled in a web pad cradle 420 of the cradle unit 410 with help of a plate being the center of weight, and at the same time, can insert extension equipment 570 like CD-ROM or FDD disk mounted in the stand unit 500 to extend the web pad system's functions. Also, the arm unit 600, as shown in FIG. 15 and FIGS. 16A and 16B, can support the cradle unit 410 to which the web pad system 700 is cradled by being coupled to the bottom surface of the cradle unit 410 and to the upper end of the stand unit 500, respectively, and simultaneously, convert the screen of the web pad system 700 to one with a specific program that enables the user to write text by using the stylus pen 200 when the cradle unit 410 gets adhered closely to the upper end of the stand unit through the arm unit's rotation and then a sliding switch 535 of the stand unit 500 is switched with help of a switch contact groove 630 at a lower end of the arm unit 600.

Cradle unit 410, another component of a docking station 400 to which the web pad system 700 is cradled while it being supported by the stand unit 500 through the connection with the arm unit 600, can enable the user to utilize the web pad system 700 as a desktop computer. The cradle unit 410 also can include a built-in web pad system separating apparatus 460 for separating the web pad system 700 from the cradle unit 410. Therefore, the user can easily separate the web pad system from the cradle unit 410 with help of a multi-step cam operation of the web pad system separating apparatus 460.

Figure 19:
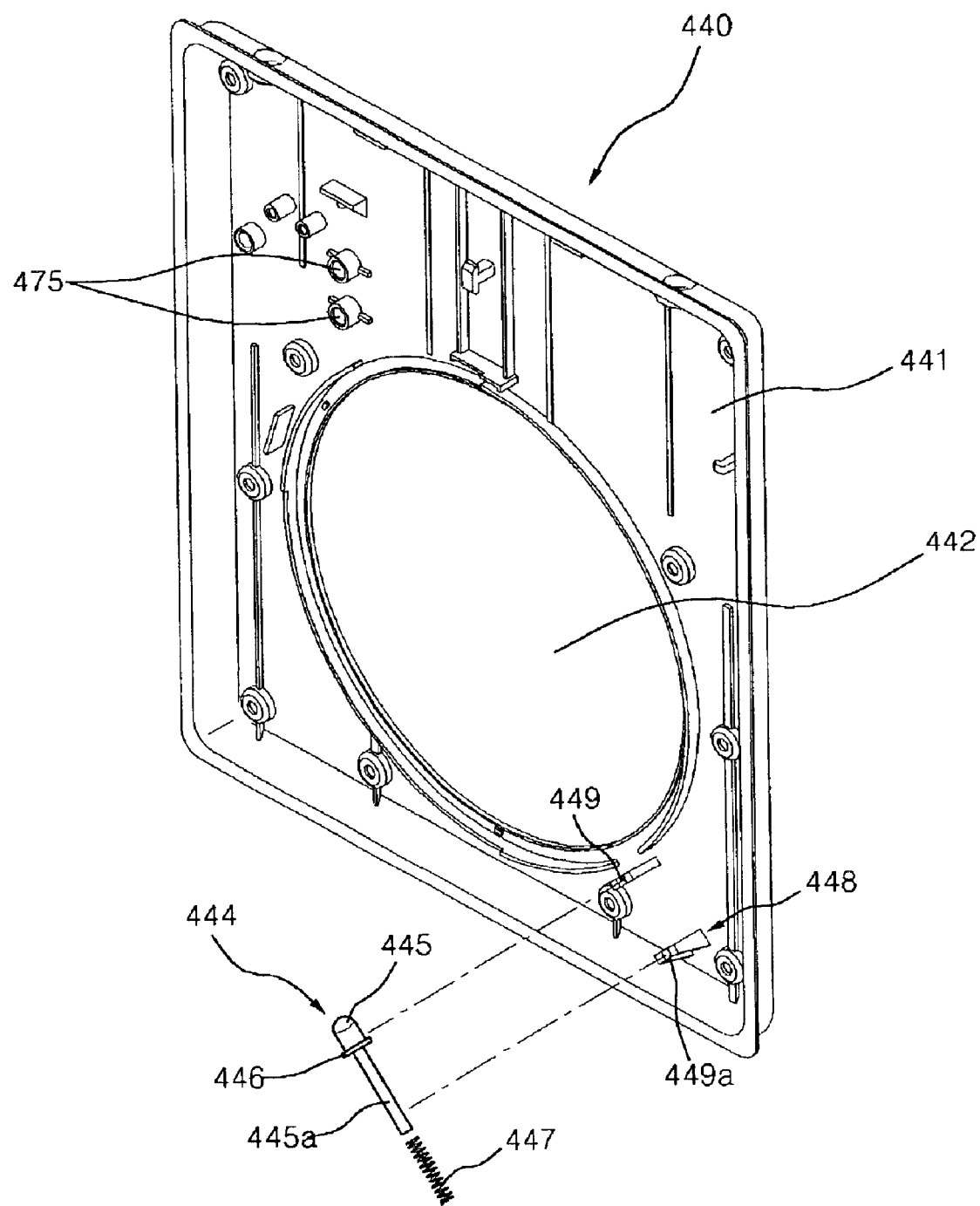
FIG. 19 is a perspective view of components of an exemplary cradle rear cover.
Figure 20:
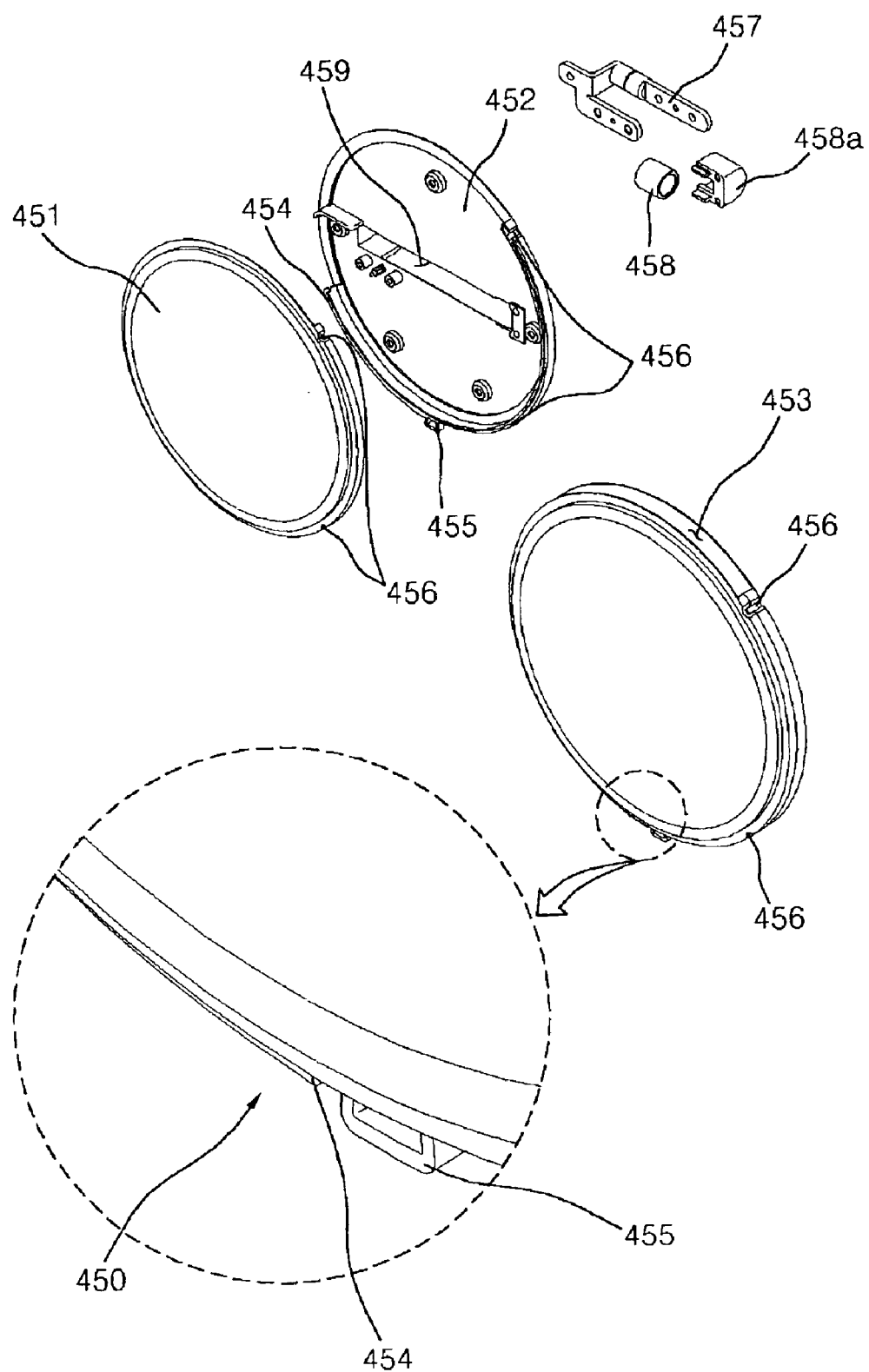
FIG. 20 is a sectional perspective view of exemplary components of a rotation guide member.

FIG. 17 is a sectional perspective view of a cradle unit according to embodiments of the present invention. FIG. 18 is a plane and bottom perspective view of a web pad cradle out of components of the cradle unit. FIG. 19 is a plane perspective view of a cradle rear cover out of components of the cradle unit. FIG. 20 is a sectional perspective view of a rotation guide member out of components of the cradle unit.

The cradle unit 410, as depicted in FIGS. 17 and 18, can include a web pad cradle 420 to which the web pad system 700 is cradled, a rear cover 440 being secured at the rear surface of the web pad cradle 420, a rotation guide member 450 and the web pad system separating apparatus 460. The rotation guide member 450 can be inserted and secured at each through hole 422, 442 formed on designated positions of the web pad cradle 420 and the cradle rear cover 440, respectively, and preferably rotating the web pad system 700 placed on the web pad cradle 420 at a designated angle (e.g., circumferential direction) depending on different usage of the user. The web pad system separating apparatus 460 can be fixated at the inner side of the cradle rear cover 440 for separating the web pad system 700 from the web pad cradle 420 preferably with help of multi-step cam motion that is made by external force applied on a separating handle 461.

The web pad cradle 420, as FIGS. 17 and 18 illustrate, can include a square-shaped cradling plate 421 on which the web pad system 700 is adhered with the through hole 422 at the center for the guide upper plate 451 of the rotation guide member 450 to be inserted, and a plurality of cradling holders 425 with a certain height at the corners of the plate 421 for enabling the web pad system 700 to be cradled onto the cradling plate 421. A fixing projection unit 429 can be inserted into the bottom surface of the web pad system 700 to reduce or prevent the web pad system 700 from moving up and down or right and left at the cradling plate 421. A drive connector 434 can be inserted in the inner side of the fixing projection 429 and also coupled to the drive socket 140 on the bottom surface of the web pad system 700 for interfacing the disk drive (e.g. extension equipment) and the web pad system 700. A plurality of angle limiting projections 436 can be formed at intervals (e.g., regular) at the circumference of the through hole 422 on the rear surface of the cradling plate 421 for limiting the web pad system 700 being cradled onto the web pad cradle 420 to rotate by more than a designated angle with help of the rotation guide member 450. In addition, an orientation switch 437 can be fixed at the circumferential surface of the through hole 422 on the rear surface of the cradling plate 421 for switching the screen mode of the web pad system 700 to portrait or landscape mode as the cradling plate 421 rotates.

Further, a ring-type guide rail 424 can be established on the through hole 422 formed on the cradling plate 421 for facilitating rotation of the web pad cradle 420 by the rotation guide member 450. A curved surface projection unit 423 with part of it being cut open can be formed on the front ending portion of the circumferential surface of the through hole 422 on the rear surface of the cradling plate 421 for allowing connecter PCB wires 435 disposed inside of the rotation guide member 450 to move freely and at the same time, for preventing the ring-shaped guide rail 424 attached to the through hole 422 from being separated when the cradling plate 421 rotates at a designated angle with help of the rotation guide member 450.

A rubber band 426 or the like can be attached inside/outside of one side of the cradle holder unit 425, respectively, for preventing the web pad system from being easily separated because of frictional force and elasticity of rubber as the web pad system 700 is cradled, and at the same time, for supporting the cradle unit 410 not to be slid onto the bottom surface as the cradle unit 410 is pulled down to be adhered closely to the bottom surface. Moreover, a hook-shaped fixing projection 427 or the like can be safely inserted inside of the lower end cradle holder unit 425 for more securely fixing the web pad system 700 on the web pad cradle 420.

In addition, a web pad settling projection 428 can be located inside of the cradle holder unit 425 for guiding and supporting the keyboard 300 of the web pad system 700, and simultaneously, for helping the web pad coupled to the keyboard 300 to be more securely and safely settled. The web pad settling projection 428 may maintain the same height as the fixing projection 429 in order to make the web pad without the keyboard 300 and the web pad system 700 to which the keyboard is connected preferably have equal height when each is attached.

A grounding member 430 for grounding the web pad system 700 can be inserted inside the fixing projection unit 429 in order to reduce or prevent any damage on the part caused by overcurrent or the like. Also, there are preferably through holes 431 at designated positions of the fixing projection unit 429 from which a locking member 468 and a separating member 472 of the separation apparatus 460 can be projected. The separation apparatus is for locking the web pad system 700 in an integrated position to web pad cradle 420 and simultaneously, for separating the web pad system 700 from the web pad cradle 420 with help of cam operation of the web pad system's separating apparatus 460.

In case of the fixing projection unit 429, there can be a connector settling projection 432 preferably with the same height as the drive connector 434 ending portion for helping the connector PCB 435 to safely settle in a designated position as the drive connector 434 ending portion attaches to the inner surface of the fixing projection unit 429 especially when the drive connector 434 is inserted. Internal thread 433 can be projected on the upper end of the connector settling projection 432, as the drive connector is inserted, is preferably slightly higher than the thickness of the connector PCB 435. If screw fastened or the like, the connector PCB 435 can form a plurality of through holes 435a at its circumferential side that have a slightly larger diameter than the projected internal thread unit 433. Therefore, when the drive connector 434 and the drive socket 140 are preferably locked to each other, the drive connector 434 can move up and down or right and left as much as the free space of the internal thread that is formed a little bit higher than the connector PCB 435, and connect with the drive socket or the like inside of the web pad system 700.

As shown in FIG. 17 and FIG. 19, the cradle rear cover 440 can include a cover member 441 fastened, for example by being screwed down, on the rear surface of the cradle plate 421. The cradle rear cover 440 can have a through hole 442 formed on an opposite position corresponding to the through hole 422 of the web pad cradle 420 for inserting a guide low plate 452 of the rotation guide member 450. A ring-shaped guide rail 443 can be attached to the through hole 442 on the cover member 441 in order to facilitate the rotation of the cradle rear cover 440 with help of the rotation guide member 450.

A hammering member 444 can be mounted at the upper end of one side of the through hole 442 for preferably generating a hammering sound through which a user can realize that the cradle unit 410 is properly rotated at a designated angle with help of the rotation guide member 450. The hammering member 444 can be fixed with help of a settling member 448 on one side of the circumferential front end of the through hole 442 to which the guide low plate 452 of the rotation guide member 450 is inserted. The hammering member 444 can have a front projection unit 445 inserted into a reentrant groove 449 at one side of the settling member 448 for enabling the hammering member 444 to hammer a hammering groove 456 on the circumferential surface of the rotation guide member 450. The hammering member 444 can be returned to its original position by indentation of the circumferential surface of the rotation guide member 450 or elastic returning force of spring 447 when the cradle rear cover 440 rotates at a designated angle or the like. A supporting rest 445a can be inserted into the reentrant groove 449 of the other settling member 448 for supporting the front projection unit 445 with help of the spring 447. A cradling jaw 446 can be formed on the circumferential surface of the front projection unit 445 for preventing the front projection unit 445 from being separated from the reentrant groove 449 on one side of the settling member 448 as it returns to the original position with help of elastic returning force of the spring 447.

Preferably, the hammering member 444 secured by the settling member 448 hits a hammering groove 456 formed on the circumferential surface of the rotation guide member 450 as it compresses/returns through the circumferential surface of the rotation guide member 450, and generates a hammering sound. Accordingly, the user can confirm that the cradle unit 410 is properly rotated at a designated angle.

As shown in FIG. 17 and FIG. 20, the rotation guide member 450 can include a rotation guide upper plate 451 to be inserted into the through hole 422 of the web pad cradle 420 for guiding rotation of the web pad cradle 420, a rotation guide low plate 452 to be inserted into the through hole 442 of the cradle rear cover 440 for guiding rotation of the cradle rear cover 440 and a cut-open groove 453 with a designated length that is formed on the two touching circumferential surfaces preferably for allowing the connector PCB 435 wires projected between the rotation guide upper plate 451 and the rotation guide low plate 452 to move more freely. Circumferential projection units 454 can be formed on the circumferential surface of the rotation guide upper plate 451 and lower plate 452, respectively, for switching the orientation fixed on the rear surface of the web pad cradle 420 preferably to convert the screen mode of the web pad system 700 to portrait mode or landscape mode when the cradle unit 410 rotates at a designated angle. A cradling projection unit 455 can be coupled to the end of the circumferential projection unit 454 for prohibiting the web pad system 700 placed on the web pad cradle 420 from being rotated more than a designated angle. The circumferential projection unit 454 can be locked to the angle limiting projection unit 436 that are regularly spaced by a designated angle on the rear surface of the cradle plate 421. Hammering grooves 456 can be spaced by a designated angle on the circumferential surface of the rotation guide member 450 and used for recognizing whether the web pad system 700 has been rotated through hammering of the hammering member 444 that is preferably mounted on one side of the cradle rear cover 440 as the cradle unit 410 is rotated the desired amount. A cradle hinge unit 457 can be fastened (e.g., screwed down) onto the other upper end of the arm unit 600 and the other side of internal arm settling groove 459 with a certain length being formed at the center of the rotation guide low plate 452 for allowing the cradle unit 410 onto which the web pad system 700 is cradled to rotate bank and forth using at least the arm unit 600. A cylindrical hinge unit 458 can be fastened at one side of the arm settling groove 459 in opposition to the cradle hinge unit 457 for supporting effluent connector PCB 435 wires from the arm settling groove 459 and at the same time, for reducing or preventing the turning force (or turning effect) of the cradle unit 410 from being placed or directed to one side only.

A length of the circumferential projection unit 454 is preferably approximately one third of the designated rotation angle of the cradle unit 410. Hence, when the cradle unit 410 rotates, the orientation switch 437 fastened on the rear surface of the web pad cradle 429 can be turned off up to ⅔ of the total length, which is shorter than the designated rotation angle of the cradle unit 410, so the screen mode of the web pad system 700 remains at its original mode, e.g., portrait mode. However, if the rotation angle of the cradle unit 410 is greater than the ⅔, which can preferably be a contact point with the circumferential projection unit 454, the orientation switch is turned on by the circumferential projection unit 454, and the screen mode of the web pad system 700 converts to landscape mode from portrait mode.

A fixing member 458a of the cylindrical hinge unit can fixate the cylindrical hinge unit. As described above, using the rotation guide member 450 and the cradle unit 410, the web pad cradle 420 and cradle rear cover 440 can be rotated.

Figure 21A:
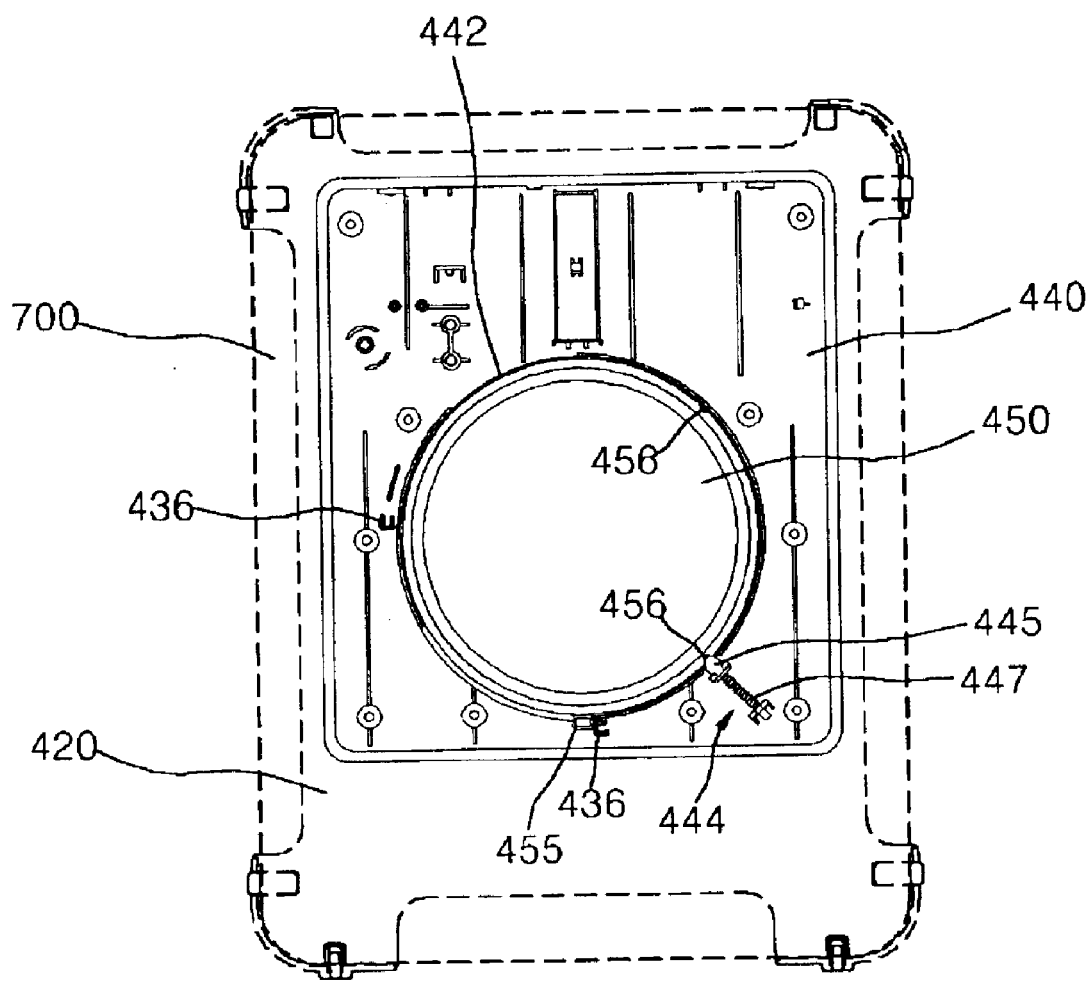
FIG. 21A is an exemplary diagram illustrating a state before a cradle unit is rotated.
Figure 21B:
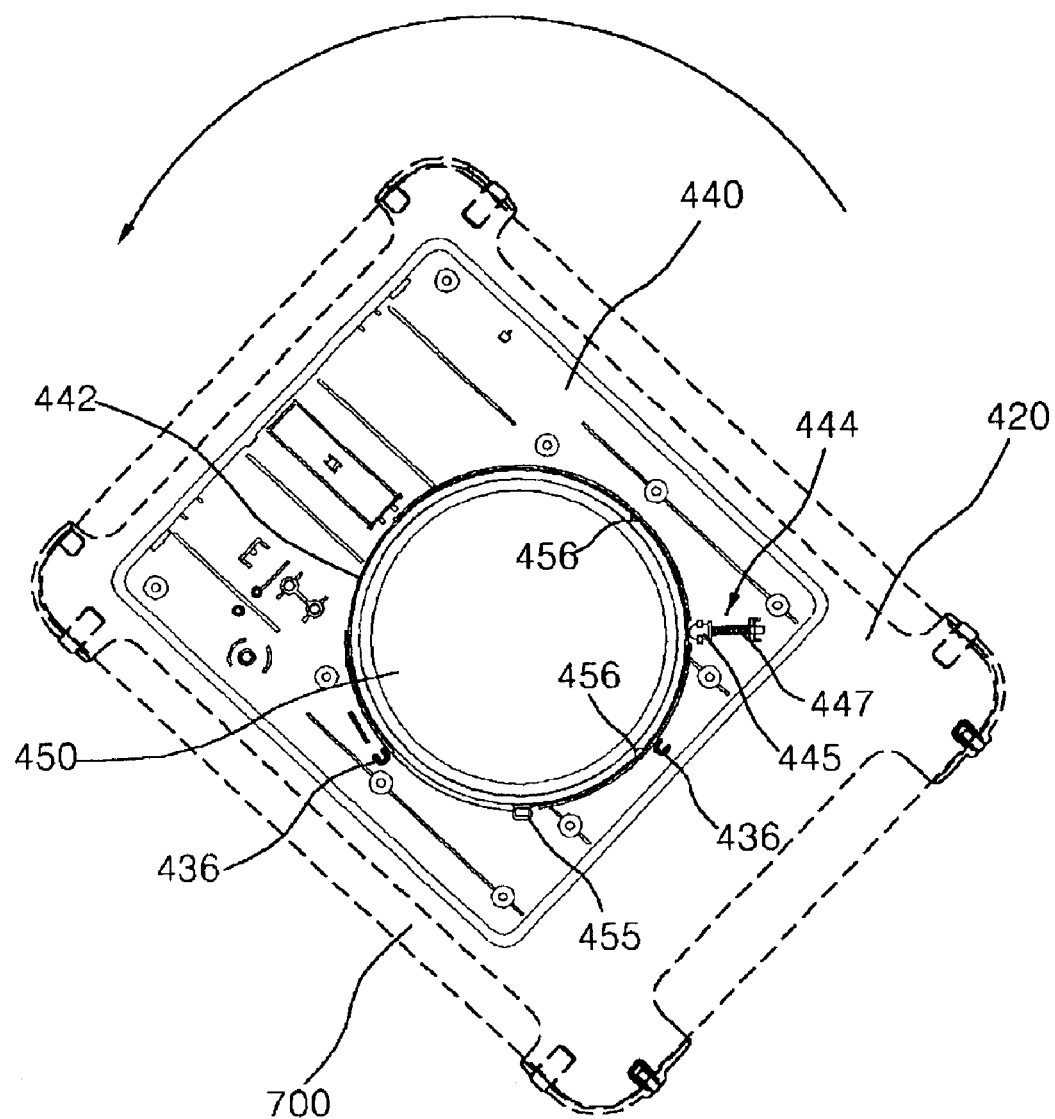
FIG. 21B is an exemplary diagram illustrating a cradle unit being rotated at a predetermined angle using a rotation guide member.
Figure 21C:
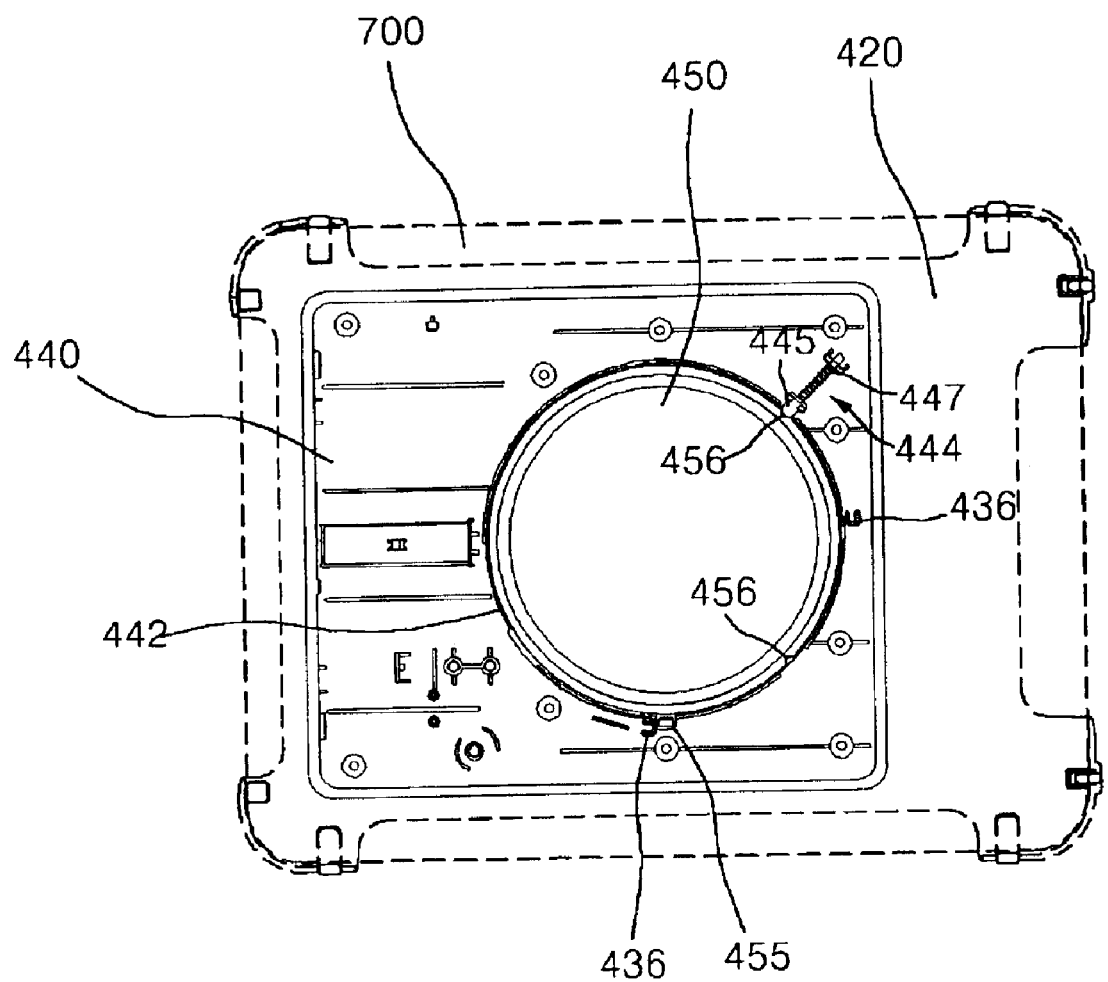
FIG. 21C is an exemplary diagram illustrating a state where the cradle unit is rotated at a designated angle.

FIGS. 21A–21C diagrammatically depict the operational state of the exemplary cradle unit being rotated at a designated angle with help of the rotation guide member according to preferred embodiments of the present invention. FIG. 21A diagrammatically shows the state before the cradle unit is rotated, FIG. 21B diagrammatically shows the cradle unit being rotated at a designated angle with help of the rotation guide member, and FIG. 21C diagrammatically shows the state where the cradle unit is rotated at a designated angle.

Figure 22A:
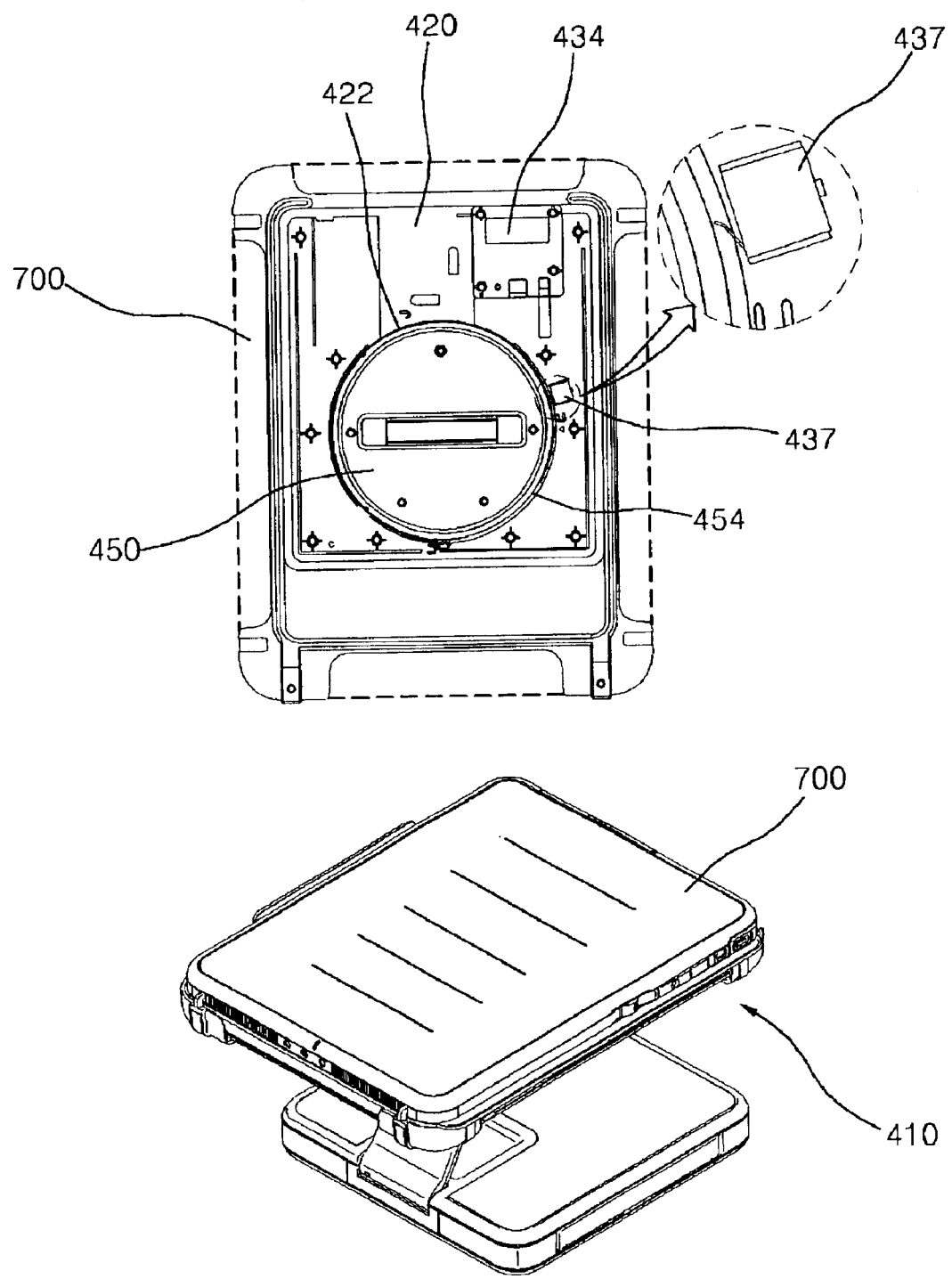
FIG. 22A diagrammatically illustrates an exemplary screen mode at the portrait mode before it is converted to the landscape mode.
Figure 22B:
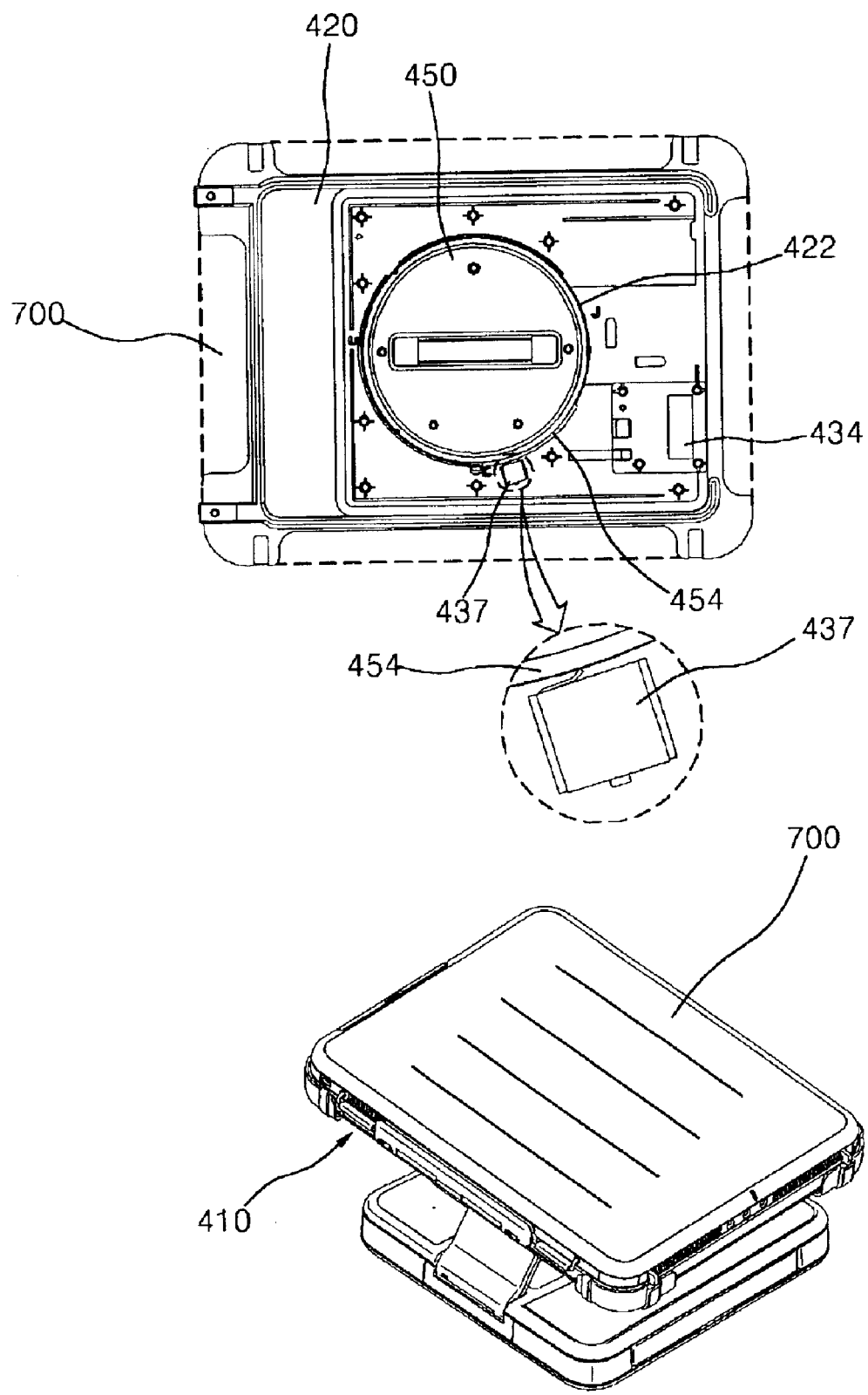
FIG. 22B diagrammatically illustrates an exemplary screen mode of the web pad system having been converted to the landscape mode from the portrait mode according to a rotation angle of the cradle unit.

FIGS. 22A–22B diagrammatically illustrate a situation in which a screen mode of the web pad system can be converted to a portrait mode or landscape mode in accordance with a rotation-angle of the cradle unit with help of the rotation guide member according to preferred embodiments of the present invention. FIG. 22A diagrammatically shows the screen mode at the portrait mode before it is converted to the landscape mode, and FIG. 22B diagrammatically shows the screen mode of the web pad system having been converted to the landscape mode from the portrait mode according to a rotation angle of the cradle unit.

To convert the screen mode of the web pad system 700 being cradled onto the web pad cradle 420 from portrait mode to landscape mode, the web pad cradle 420 can be first rotated as shown in FIG. 21A. Then as shown in FIGS. 21A–21C, the web pad cradle 420 can be rotated by pressuring the front projection unit 445 of the hammering member 444 mounted at one side of the front end of the outer circumferential surface of the through hole 442 of the cradle rear cover 440 using the circumferential surface of the rotation guide member 450. Later, when the web pad cradle 420 preferably rotates at a designated angle or amount and then reaches to one hammering groove 456 on the circumferential surface of the rotation guide member 450, the front projection unit 445 of the hammering member 444, as shown in FIG. 21C, having been pressured by the circumferential surface of the rotation guide member 450 returns to its original position, and hits the hammering groove 456. In the course of that, a hammering sound or vibration is preferably generated, and through the hammering sound or vibration, the user can preferably find out that the cradle unit 410 has been properly rotated, and he/she does not need to rotate the cradle unit 410 any further.

Preferably, if the user rotates the cradle unit 410 by more than allowed, the cradling projection unit 455 of the rotation guide member 450 can be cradled onto the angle limiting projection unit 436 being spaced by the designated angle on the outer circumferential surface of the through hole 422 of the rear surface of the web pad cradle 420. Accordingly, further rotation of the cradle unit 410 can be successfully prevented or reduced.

As FIG. 22A illustrates, when the cradle unit 410 is rotated at a designated angle with help of the rotation guide member 450 while the web pad system is being cradled onto the cradle 410, the orientation switch 437 fixed on the outer circumferential surface of the through hole 422 of the rear surface of the web pad cradle 420 is preferably switched with help of the circumferential projecting unit 454 formed on the circumferential surface of the rotation guide member 450. The switched signal can be transferred to the web pad system 700, for example, through the drive connector 434. As a result, the screen mode of the web pad system 700 is preferably converted from portrait mode to landscape mode as shown in FIG. 22B.

Also, if the user rotates the cradle unit 410 to the opposite direction to return the screen mode in the landscape mode back to the portrait mode, the orientation switch having been switched by the circumferential projection unit 454 of the rotation guide member 450 is preferably released or switched back. Accordingly, the screen mode can be converted from landscape mode to portrait mode.

Figure 23:
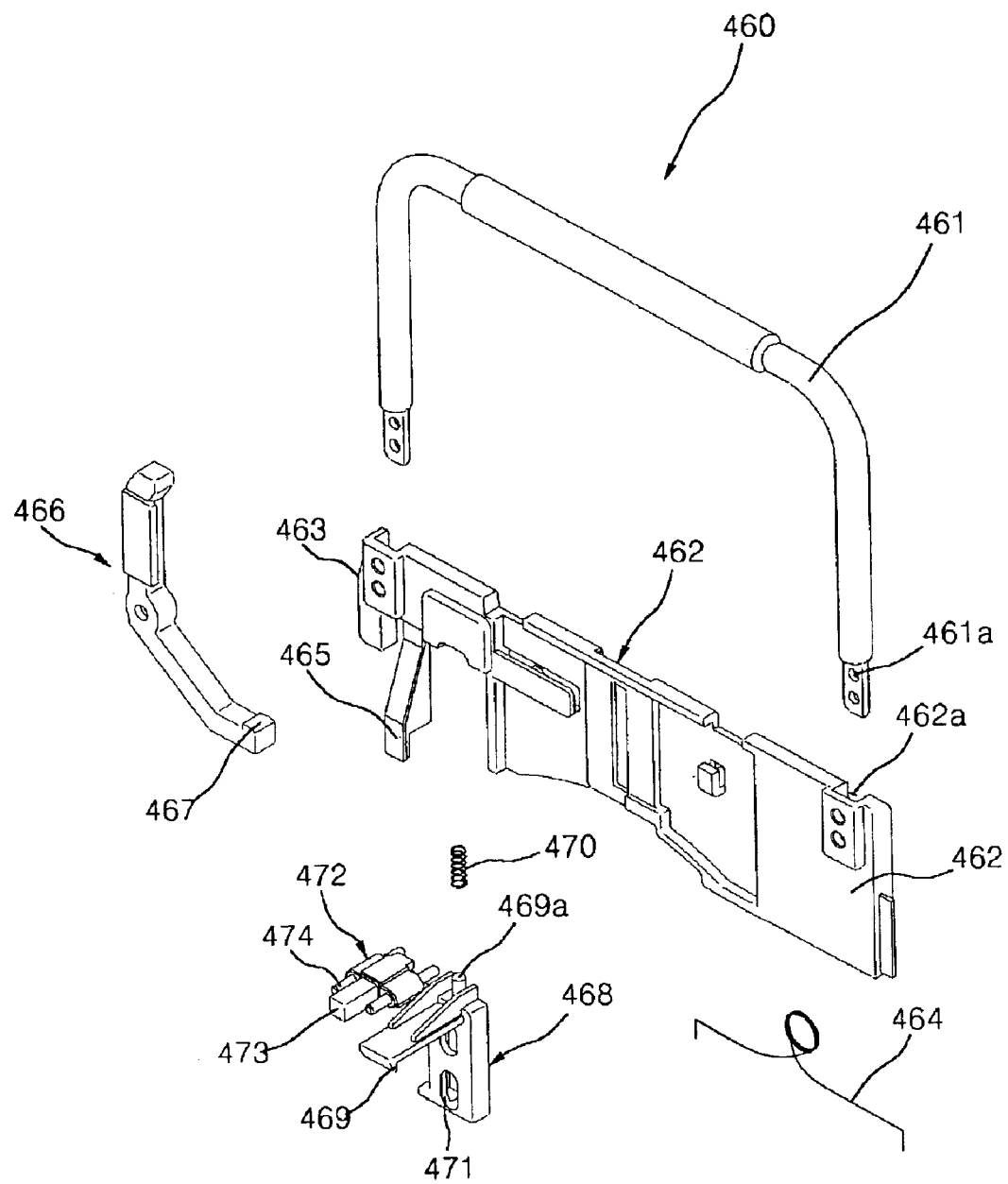
FIG. 23 is a sectional perspective view of an exemplary web pad system separating apparatus.

FIG. 23 is a sectional perspective view of a web pad system separating apparatus out of components of the cradle unit according to preferred embodiments of the present invention. The web pad system separating apparatus 460, as depicted in FIG. 17 and FIG. 23, can include a separating handle 461 for applying external force to separate the web pad system 700 from the web pad cradle 420, an operational cam member 466, a locking member 468 and a separating member 472. An interlocking member 462 can be coupled to the separating handle 461 to preferably perform cam operations by moving downward in order to separate the web pad system 700 from the web pad cradle 420 as the external force is applied through the separating handle 461, and returns to its original position with help of resilient force of the spring 464 or the like if no weight is present. The operational cam member 466 can pressure and release force of the locking member 468 that locks the web pad system 700 preferably through the cam operation with the cam 463 on the side of the interlocking member 462 by the interlocking member 462. The locking member 468 preferably with a cradling projection 469 on the upper end can be inserted to a coupling projection 475 at a low end of the operational cam member 466, of which locking force is released by a projection unit 467 of the other side of the operational cam member 466 that can be interlocked downward through the cam operation with the interlocking member 462, or can lock with the web pad system 700 by the cradling projection 469 by returning to its original position with help of the resilient force of the spring 460 if no external force is present. The separating member 472 preferably fixated on the upper end of the projected cam 465 of the interlocking member 462 can be for separating the web pad system 700 when locking force of the locking member 468 has been released as the locking member 468 ascends through the cam operation with the projected cam 465 of the interlocking member 462, from the web pad cradle 420.

There can be a plurality of inserting holes 471 at the lower end of the locking member 468 so that the locking member 468 can be inserted into the low end of the operational cam member 466, e.g., the coupling projection 475 at the inner side of the cradle rear cover 440. Preferably, the inserting hole 471 is long enough for the locking member 468 to interlock downward with help of the projection unit of the other side of the operational cam member 466 that interlocks downward through the cam operation with the interlocking member 462.

The separating member 472 can have a concave-convex shape. That is, a square pillar projection unit 471 can be projected on the upper side of the member, and a guide bar 474 can be inserted into both sides of the square pillar projection unit 473 for acting as a guide to help the separating member 472 to smoothly ascend/descend through the cam operation with the projection cam 465 of the interlocking member 462. The separating member 472 can be united with the interlocking member 462 at its upper end, and have the projection cam 465 being inserted therein to facilitate ascending/descending of the square pillar projection unit 473 through the cam operation with the projection cam 465 that preferably moves to the same direction as the interlocking member 462 in conforming to the operation of the interlocking member 462.

Figure 24A:
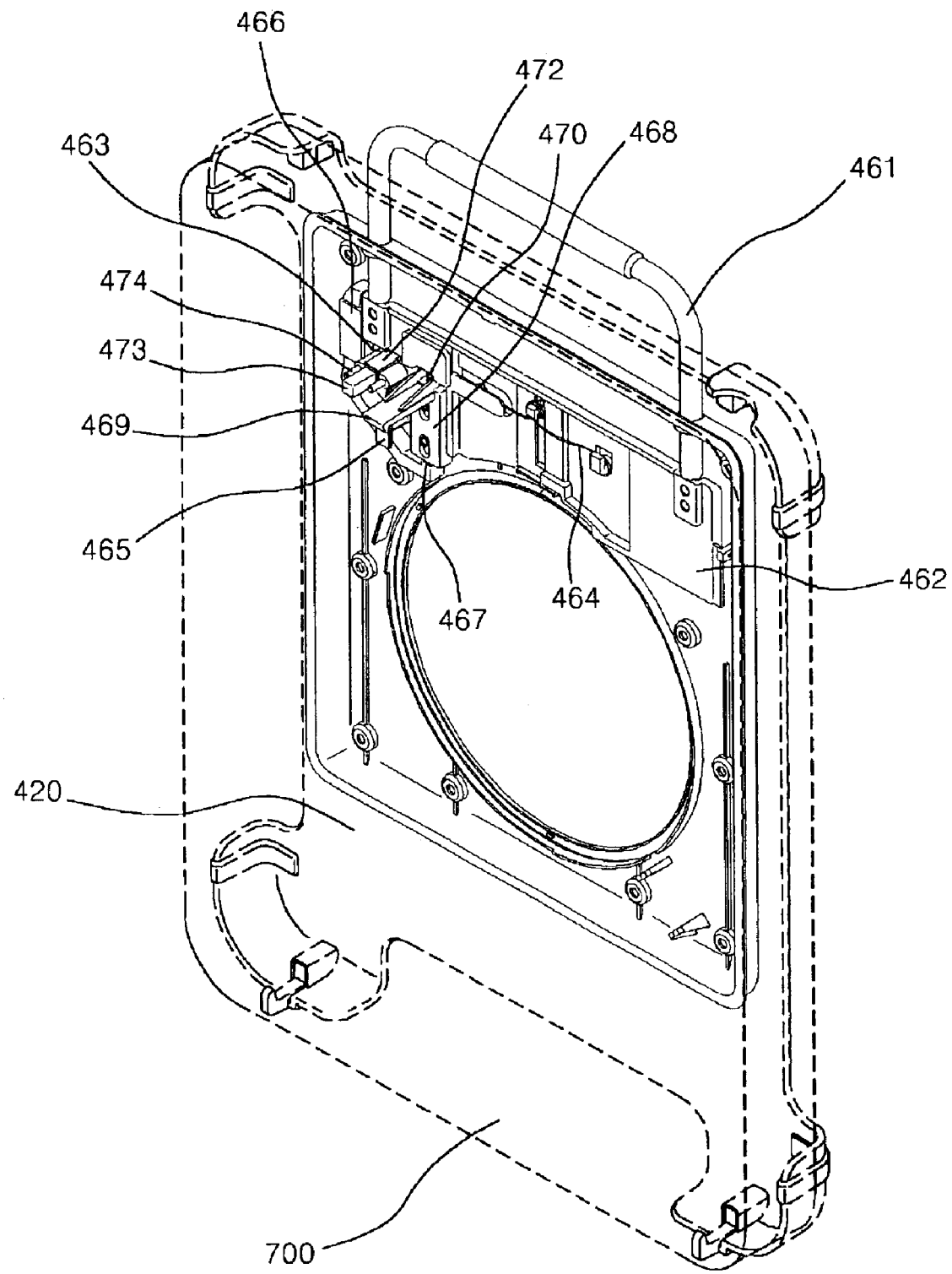
FIG. 24A diagrammatically represents the state before an exemplary web pad system separating apparatus is operated.
Figure 24B:
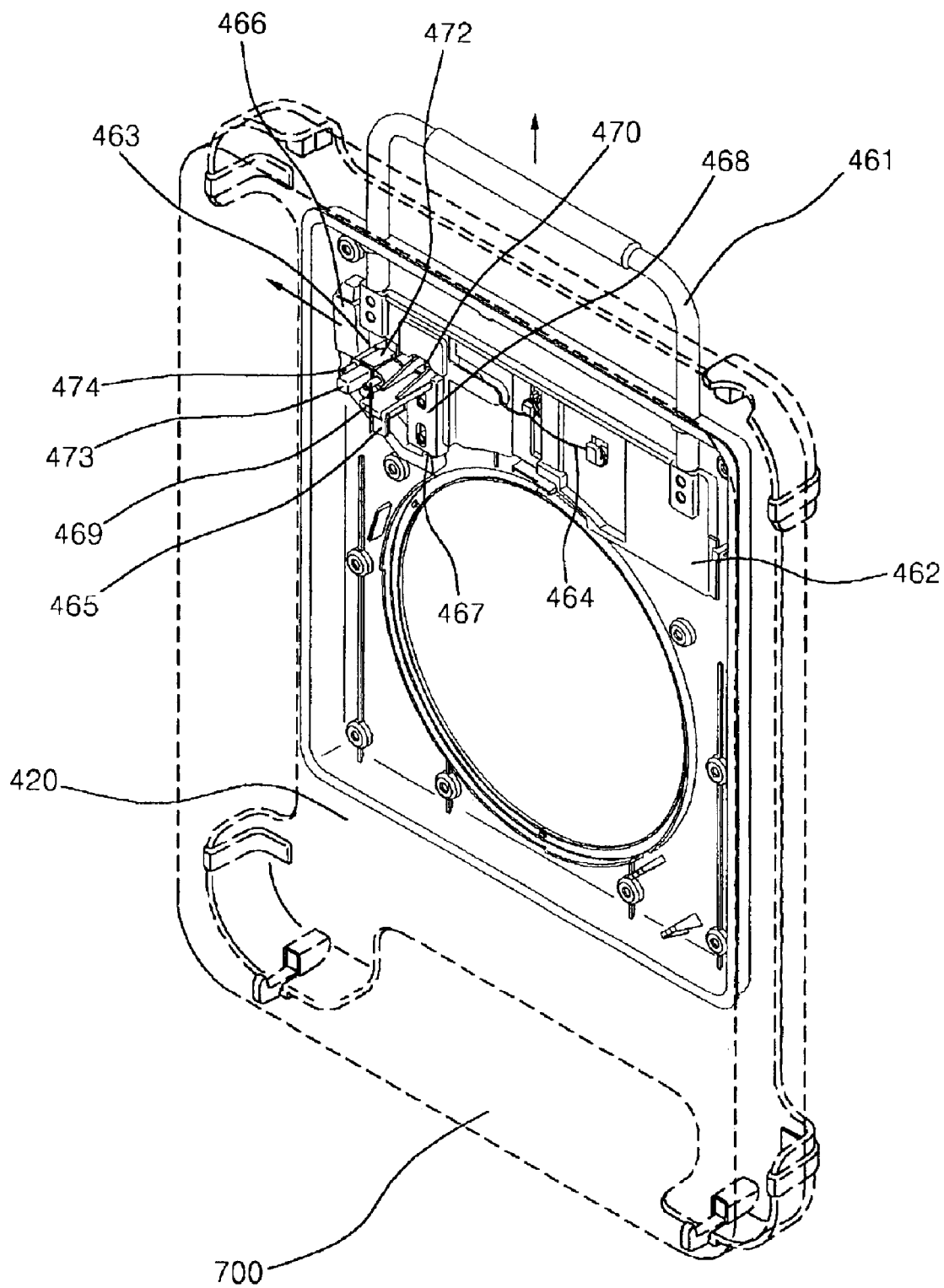
FIG. 24B diagrammatically represents the state where an exemplary locking member engages.
Figure 24C:
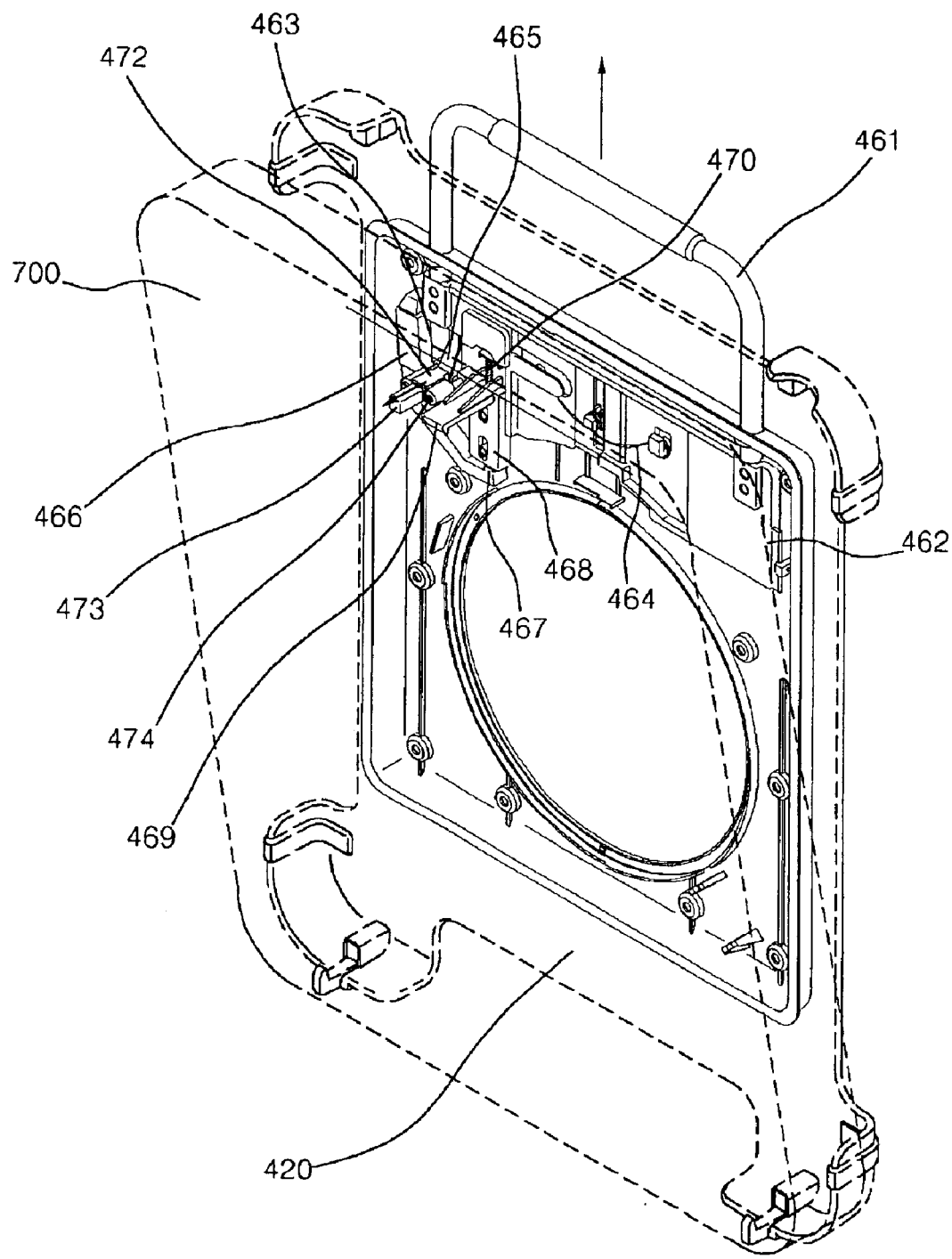
FIG. 24C diagrammatically represents the state where an exemplary locking member-has been released.

FIG. 24A diagrammatically represents the state before a web pad system separating apparatus is operated. FIG. 24B diagrammatically represents the state where locking force of an exemplary locking member that locks the web pad system by the operation of the exemplary web pad system separating apparatus is being released. FIG. 24C diagrammatically represents the state where the web pad system of which locking force of the locking member having been released by the operation of the exemplary web pad system separating apparatus is being separated by a separating member.

If the user wants to separate the web pad system 700 that is cradled onto the web pad cradle 420, he/she can pull the separating handle 461, as shown in FIG. 24A. Then, the interlocking member 462 coupled to the separating handle 461 moves downward, and preferably one side of the operational cam member 466 where the cam operation involving a side cam 463 of the interlocking member 462 and the operational cam member 466 takes place, becomes open to the outside, and the projection unit 467 of the other side of the operational cam member 466 interlocks toward the locking member 468, thereby pressuring the locking member 468.

Further, spring 470 of the locking member 468 having been pressuring by the projection unit 467 of the other side of the operational cam member 466 can be compressed, and the interlocking member 462 is pressured and downward, which is the same direction as the interlocking member 462. At the same time, the cradling projection 469 of the locking member 468 can be pushed down, and, as FIG. 24B depicts, the locking force of the cradling projection 469 for locking the web pad system 700 can be released. In this manner, the web pad system 700 can be duly separated from the web pad cradle 420.

In case that the interlocking member 462 further descends despite of the locking force of the locking member 468 having already been released, as shown in FIG. 24C, the square pillar projection unit 473 can ascend by traveling on the guide bars 474 on the both sides through the cam operation of the projection cam 465 and the separating member 472. The square pillar projection unit 473 can push up the web pad system 700 without coupling force in the locking member 469, and separates the web pad system 700 from the web pad cradle 420.

If the external force is no longer applied to the separating handle 461, the interlocking member 462 and the locking member 468 can go back to their original positions preferably with help of resilient force of the spring 464 of the interlocking member 462 being freed from tension and the spring 470 of the locking member 468 being freed from compression. As described above, the web pad system 700 can be separated through the cam operation of the web pad system separating apparatus 460.

As described above, preferred embodiments of an attachable/detachable keyboard apparatus of portable multi-type computer system according to the present invention have various advantages that can be independently, partially, and in combination achieved. Preferred embodiments of an attachable/detachable keyboard apparatus of portable multi-type computer system according to the present invention can be used for a computer with web pad function and notebook PC function. Users can easily attach the keyboard apparatus to the main body of the system, and input text or data only when necessary. Further, the system can be used as web pad only with the keyboard detached from the system. In addition, the keyboard apparatus can be coupled and carried with the web pad folded together.

Embodiments of the present invention can provide a screen converting structure of a web pad system having a convertible screen from portrait mode to landscape mode or from landscape mode to portrait mode, and a rotary cradle on which the web pad system is placed, and an arm attached to controllably pivot the rotary cradle to between prescribed heights related to a stand while providing a prescribed viewing angle relative to horizontal. Embodiments of the present invention can allow users to use the system in an appropriate mode more conveniently, for example, by rotating a cradle at a designated angle at anyplace.

Embodiments of the present invention can provide a portable multi-type computer system that can includes a portable computer, a keyboard assembly, wherein the keyboard assembly include a keyboard case rotatably and detachably coupled to the portable computer, and a docking station configured to receive the portable computer, and a stand pivotably attached to the dock Embodiments of the present invention provides more convenience to users with their work, in which the users can rotate a keyboard assembly or a dock and change a height on which the web pad system is cradled at a designated angle to be appropriate for users' viewing angles or particular places. Further, a screen mode of the web pad system can be correspondingly updated and power can be conserved.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art.

What is claimed is:

1. A portable multi-type computer system, comprising:
   a portable computer;
   a keyboard assembly, wherein the keyboard assembly comprises,
      a keyboard case with an input device exposed in an upper surface thereof, and
      a connector mounted on the keyboard case with a plurality of universal pivots to detachably couple the keyboard assembly to the portable computer; and
   a docking station, wherein the docking station comprises,
      a dock configured to receive the portable computer, and
      a stand pivotably attached to the dock,
      wherein the plurality of pivots secure a web pad being the portable computer to the keyboard assembly, and
      wherein the web pad is rotatably attached by the plurality of pivots to cover the input device in a closed position with a first surface of the web pad in a first orientation abutting against the input device and to cover the input device in the closed position with a second surface of the web pad in a second orientation abutting against the input device, said second orientation being opposite to the first orientation.

2. The system of claim 1, wherein the dock is configured to receive the portable computer coupled to the keyboard assembly.

3. The system of claim 1, wherein the keyboard assembly comprises a rotating member that comprises:
   a rotational disk that rotates around a fixed point relative to the upper surface of the keyboard case; and
   a hinge rigidly coupled to the rotational disk displaced a prescribed distanced from the fixed point.

4. The system of claim 1, wherein the web pad has a touch sensitive display unit for viewing information processed by the web pad exposed in the first surface, and wherein the display unit can be used to operate the web pad in the second orientation when the keyboard apparatus is in a closed position.

5. The system of claim 4, wherein the input device is accessible in the open position and covered in the closed position, and a fastener locks the web pad to the keyboard apparatus in the both the first and second orientations when in the closed position.

6. The system of claim 3, wherein a sensor is configured to sense when the portable computer is coupled to the connector, and wherein the input device is disabled based on the sensor unless the web pad is in an open position.

7. The system of claim 6, further comprising:
an arm pivotably coupled between the dock and stand;
a first pivot attached to the stand and the arm configured to adjust a height of the dock; and
a second pivot attached to the arm and the dock configured to adjust an angle between the dock and the stand.

8. The apparatus of claim 7, wherein the stand comprises at least one peripheral device, and wherein the at least one peripheral device comprises at least one of a storage device, a disk drive, a input/output device port, an input port, an output port, power source, audio indicator, visual indicator, and a network interface.

9. A system, comprising:
a keyboard case with an input device exposed in an upper surface thereof;
a portable computer rotatably and pivotably supported by the keyboard case; and
a connector mounted on the keyboard case to support the portable computer,
wherein the connector comprises,
a rotational disk that rotates around a fixed point relative to the upper surface of the keyboard case, and
a hinge rigidly coupled to the rotational disk displaced a prescribed distanced from the fixed point, and
a docking projection including at least one universal pivot on one side of the connector that secures a web pad being the portable computer to the connector, and
wherein the web pad is selectively attached by the docking projection to covet the input device in a closed position with a first surface of the web pad in a first orientation abutting against the input device and to cover the input device in the closed position with a second surface of the web pad in a second orientation abutting against the input device, said second orientation being opposite to the first orientation.

10. The system of claim 9, wherein the rotational disk rotates between a first position and a second position, wherein the hinge is positioned at an outer edge of the keyboard case in the first position and an inner portion of the upper surface corresponding to the input device in the second position.

11. The system of claim 10, wherein the connector comprises a switch, wherein the switch enables the input device when the rotational disk is in the second position.

12. The system of claim 10, wherein the rotating disk comprises:
a rotation guide member attached to the keyboard case that defines a rotational path; and
a keyboard disk assembly for rotating along the rotational path between the first position and the second position, and wherein the input device is enabled only in the second position.

13. The system of claim 12, wherein the rotating disk comprises:
an upper rotation guide member attached to the keyboard case;
a lower rotation guide member with a data input mode inverting switch at a designated position; and
a keyboard disk assembly for rotating along a guide rail formed between the upper rotation guide member and the lower rotation guide member.

14. The system of claim 12, wherein the web pad has a touch sensitive display unit for viewing information processed by the web pad exposed in the first surface, and wherein the display unit can be used to operate the web pad in the second orientation when the connector is in a closed position.

15. The system of claim 9, further comprising a docking station, wherein the docking station comprises:
a dock configured to receive the portable computer; and
a stand pivotably attached to the dock;
a first pivot attached to the stand configured to adjust a height of the dock; and
a second pivot attached to the dock configured to adjust an angle between the dock and the stand.

16. The system of claim 13, wherein the stand comprises at least one peripheral device, and wherein the at least one peripheral device comprises at least one of a storage device, a disk drive, a input/output device port, an input port, an output port, power source, audio indicator, visual indicator, and a network interface.

17. An apparatus, comprising:
a portable computer;
a dock configured to receive the portable computer;
a stand pivotably attached to the dock, wherein the dock is pivotably attached to the stand by a plurality of universal pivots, and
a keyboard assembly including a universal coupling mechanism configured to allow in a first engagement the portable computer to be engaged with the keyboard assembly with a first surface of the portable computer abutting against the keyboard assembly and in a second engagement a second surface of the portable computer abutting against the keyboard assembly.

18. The apparatus of claim 17, wherein the plurality of pivots comprises a first pivot configured to adjust the height of the dock and a second pivot configured to adjust an angle between the dock and the stand.

19. The apparatus of claim 18, wherein the plurality of pivots comprises a third pivot configured to allow rotation of the dock.

20. The apparatus of claim 19, wherein the portable computer comprises a display that is viewable when the portable computer is docked in the dock, and wherein the third pivot is configured to allow rotation of the dock to selectively switch the display between a landscape mode and a portrait mode.

21. The apparatus of claim 20, further comprising a sensor configured to sense if the display is rotated to a prescribed orientation, wherein the portable computer selectively updates the landscape mode and the portrait mode of the display responsive to a signal from the sensor, and wherein the portable computer has at least two perpendicular physical dimensions greater than ten inches.

22. The apparatus of claim 17, wherein the stand comprises at least one peripheral device, and wherein the at least one peripheral device comprises at least one of a storage device, a disk drive, a input/output device port, an input port, an output port, power source, audio indicator, visual indicator, and a network interface.

23. A method, comprising:
providing a portable computer; and
supporting the personal computer in a docking station, wherein the supporting the personal computer in a docking station comprises,
receiving the portable computer in a dock,
pivotably attaching the dock to a stand, and
providing a keyboard apparatus, wherein providing the keyboard apparatus comprises, providing a keyboard case with a keyboard exposed in an upper surface thereof, and providing a connector mounted on the keyboard case with a plurality of universal pivots to detachably couple the keyboard apparatus to the portable computer in a first arrangement in which a first surface of the portable computer abuts against the keyboard assembly and in a second arrangement in which a second surface of the portable computer opposite to the first surface abuts against the keyboard assembly.

24. The method of claim 23, further comprising:

providing a first pivot for adjusting a height of the dock; and providing a second pivot for adjusting an angle between the dock and the stand.

25. The method of claim 24, further comprising providing a third pivot for adjusting rotation of the dock, wherein the portable computer comprises a display that is viewable when the portable computer is docked in the dock, and wherein the personal computer selectively switches the display between a landscape mode and a portrait mode responsive to the rotation of the dock.

26. The method of claim 25, wherein the dock is configured to receive the portable computer coupled to the keyboard assembly.

27. The method of claim 25, wherein the stand comprises at least one peripheral device, and wherein the at least one peripheral device comprises at least one of a storage device, a disk drive, a input/output device port, an input port, an output port, power source, audio indicator, visual indicator, and a network interface.

28. The system of claim 1, wherein the web pad is detachably attached to the plurality of pivots such that the web pad can be detachably removed from the plurality of pivots and rotated to switch between the closed position in the first orientation or the closed position in the second orientation.

29. The system of claim 9, wherein the web pad is detachably attached to the docking projection such that the web pad can be detachably removed from the docking projection and rotated to switch between the closed position in the first orientation or the closed position in the second orientation.

30. The apparatus of claim 17, wherein the portable computer is detachably attached to the universal coupling mechanism such that the portable computer can be detachably removed from the universal coupling mechanism and rotated to switch between the closed position in the first engagement or the closed position in the second engagement.

31. The method of claim 23, wherein the portable computer is detachably attached to the plurality of universal pivots such that the portable computer can be detachably removed from the plurality of universal pivots and rotated to switch between the closed position in the first arrangement or the closed position in the second arrangement.

* * * * *